(12) United States Patent
Yabe

(10) Patent No.: US 11,893,295 B2
(45) Date of Patent: Feb. 6, 2024

(54) SYSTEM FOR ESTIMATING A SETTING VALUE USING A TRAINED MODEL GENERATED BY COLLECTING DATA ON A DEVICE

(71) Applicant: CANON KABUSHIKI KAISHA, Tokyo (JP)

(72) Inventor: Kenta Yabe, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 231 days.

(21) Appl. No.: 17/375,967

(22) Filed: Jul. 14, 2021

(65) Prior Publication Data
US 2021/0342108 A1 Nov. 4, 2021

Related U.S. Application Data

(63) Continuation of application No. PCT/JP2020/000459, filed on Jan. 9, 2020.

(30) Foreign Application Priority Data

Jan. 18, 2019 (JP) .............................. JP2019-007010

(51) Int. Cl.
*G06F 3/12* (2006.01)
*G06N 20/00* (2019.01)
*H04N 1/00* (2006.01)

(52) U.S. Cl.
CPC .......... *G06F 3/1279* (2013.01); *G06F 3/1205* (2013.01); *G06N 20/00* (2019.01); *H04N 1/00015* (2013.01); *H04N 1/00037* (2013.01); *H04N 1/00082* (2013.01); *H04N 1/00129* (2013.01)

(58) Field of Classification Search
CPC .......... H04N 1/00037; H04N 1/00082; H04N 1/00129; G06F 3/1255
USPC ...................................... 358/1.13, 1.14, 1.15
See application file for complete search history.

(56) References Cited

U.S. PATENT DOCUMENTS

| 11,048,455 B1* | 6/2021 | Armstrong ............ G06F 3/1208 |
| 2014/0078534 A1 | 3/2014 | Oda |
| 2016/0259600 A1* | 9/2016 | Verduin ................ G06F 3/1254 |
| 2021/0173596 A1* | 6/2021 | Matsushita ............ G06N 20/00 |

FOREIGN PATENT DOCUMENTS

| CN | 102170503 A | 8/2011 |
| JP | 2003345193 A | 12/2003 |
| JP | 2004185464 A | 7/2004 |
| JP | 2004266408 A | 9/2004 |
| JP | 2008077160 A | 4/2008 |
| JP | 2014059689 A | 4/2014 |
| JP | 2014203391 A | 10/2014 |

(Continued)

*Primary Examiner* — Kent Yip
(74) *Attorney, Agent, or Firm* — Canon U.S.A., Inc IP Division

(57) ABSTRACT

A system includes a determination unit configured to determine whether an estimated setting value is settable on a device based on device information obtained by the obtaining unit, and an adjustment unit configured to adjust, if the determination unit determines that the estimated setting value is unable to be set, the estimated setting value. The device used by the user displays the setting value adjusted by the adjustment unit as a setting value related to device processing.

10 Claims, 20 Drawing Sheets

(56) References Cited

FOREIGN PATENT DOCUMENTS

| | | | |
|---|---|---|---|
| JP | 2015176293 | A | 10/2015 |
| JP | 2018069684 | A | 5/2018 |
| JP | 2018099817 | A | 6/2018 |

\* cited by examiner

FIG.4B

Collected data information 450

{"time":"2017-01-01T08:38:34.702Z", "eventid":"event0001", "entity":"device", "eventName":"powerOn", "tenantid":"tenant0002", "deviceSerialId":"zzz99999", "productName":"MFP_AAAA",...}
{"time":"2017-01-01T08:39:35.892Z", "eventid":"event0002", "entity":"device", "eventName":"powerOn", "tenantid":"tenant0001", "deviceSerialId":"zzz11111", "productName":"MFP_AAAA",...}
{"time":"2017-01-01T08:43:39.131Z", "eventid":"event0003", "entity":"device", "eventName":"sleep", "tenantid":"tenant0002", "deviceSerialId":"zzz99999",...}
{"time":"2017-01-01T08:45:25.653Z", "eventid":"event0004", "entity":"device", "eventName":"powerOn", "tenantid":"tenant0001", "deviceSerialId":"zzz22222", "productName":"MFP_BBBB",...}
{"time":"2017-01-01T10:03:53.052Z", "eventid":"event0005", "entity":"userAction", "eventName":"login", "tenantid":"tenant0001", "deviceSerialId":"zzz11111", "userid":"user1111",...}
{"time":"2017-01-01T10:05:21.563Z", "eventid":"event0006", "entity":"job", "jobid":"job1111", "tenantid":"tenant0001", "deviceSerialId":"zzz11111", "userid":"user1111", "jobType":"copy", "eventName":"jobStarted",...}
{"time":"2017-01-01T10:06:01.159Z", "eventid":"event0007", "entity":"job", "jobid":"job1111", "tenantid":"tenant0001", "deviceSerialId":"zzz11111", "userid":"user1111", "jobType":"copy", "eventName":"jobCompleted", "input.paperSize":"A4", "input.pageNumber":10, "printSettings.copies":1, "printSettings.colorMode":"color", "printSettings.layout":"2in1", "printSettings.paperside":"2Sided", "output.paperSize":"A4", "output.paperNumber":3,...}
{"time":"2017-01-01T10:06:20.561Z", "eventid":"event0008", "entity":"device", "eventName":"sleep", "tenantid":"tenant0001", "deviceSerialId":"zzz11111",...}
{"time":"2017-01-01T10:11:07.160Z", "eventid":"event0009", "entity":"userAction", "eventName":"logOut", "tenantid":"tenant0001", "deviceSerialId":"zzz11111", "userid":"user1111",...}
{"time":"2017-01-01T12:28:36.511Z", "eventid":"event0010", "entity":"userAction", "eventName":"login", "tenantid":"tenant0001", "deviceSerialId":"zzz22222", "userid":"user2222",...}
{"time":"2017-01-01T12:29:11.991Z", "eventid":"event0011", "entity":"job", "jobid":"job2222", "tenantid":"tenant0001", "deviceSerialId":"zzz22222", "userid":"user2222", "jobType":"copy", "eventName":"jobStarted",...}
{"time":"2017-01-01T12:30:25.516Z", "eventid":"event0012", "entity":"job", "jobid":"job2222", "tenantid":"tenant0001", "deviceSerialId":"zzz22222", "userid":"user2222", "jobType":"copy", "eventName":"jobCompleted", "input.paperSize":"A4", "input.pageNumber":1, "printSettings.copies":5, "printSettings.colorMode":"mono", "printSettings.layout":"1in1", "printSettings.paperside":"1Sided", "output.paperSize":"A4", "output.paperNumber":5,...}
{"time":"2017-01-01T12:30:58.981Z", "eventid":"event0013", "entity":"job", "jobid":"job3333", "tenantid":"tenant0001", "deviceSerialId":"zzz22222", "userid":"user2222", "jobType":"copy", "eventName":"jobStarted",...}
{"time":"2017-01-01T12:31:35.011Z", "eventid":"event0014", "entity":"job", "jobid":"job3333", "tenantid":"tenant0001", "deviceSerialId":"zzz22222", "userid":"user2222", "jobType":"copy", "eventName":"jobCompleted", "input.paperSize":"A4", "input.pageNumber":1, "printSettings.copies":5, "printSettings.colorMode":"mono", "printSettings.layout":"1in1", "printSettings.paperside":"1Sided", "output.paperSize":"A4", "output.paperNumber":5,...}
{"time":"2017-01-01T12:31:38.511Z", "eventid":"event0015", "entity":"userAction", "eventName":"logOut", "tenantid":"tenant0001", "deviceSerialId":"zzz22222", "userid":"user2222",...}
{"time":"2017-01-01T13:25:51.602Z", "eventid":"event0016", "entity":"device", "eventName":"powerOff", "tenantid":"tenant0001", "deviceSerialId":"zzz22222",...}
...

FIG.5A

Vectorization information 500

| input.colorMode | |
|---|---|
| color | 0 |
| mono | 1 |

501

| output.colorMode | |
|---|---|
| color | 0 |
| mono | 1 |

502

| layout | |
|---|---|
| 1in1 | (1,0,0,0,0) |
| 2in1 | (0,1,0,0,0) |
| 4in1 | (0,0,1,0,0) |
| 8in1 | (0,0,0,1,0) |
| 16in1 | (0,0,0,0,1) |

503

| paperside | |
|---|---|
| 1Sided | 0 |
| 2Sided | 1 |

504

| dpi | |
|---|---|
| 100 | (1,0,0,0,0) |
| 200 | (0,1,0,0,0) |
| 300 | (0,0,1,0,0) |
| 400 | (0,0,0,1,0) |
| 500 | (0,0,0,0,1) |

505

| input.paperSize | |
|---|---|
| A0 | (1,0,0,0,0,...) |
| A1 | (0,1,0,0,0,...) |
| A2 | (0,0,1,0,0,...) |
| A3 | (0,0,0,1,0,...) |
| A4 | (0,0,0,0,1,...) |
| ... | ... |

506

| output.paperSize | |
|---|---|
| A0 | (1,0,0,0,0,...) |
| A1 | (0,1,0,0,0,...) |
| A2 | (0,0,1,0,0,...) |
| A3 | (0,0,0,1,0,...) |
| A4 | (0,0,0,0,1,...) |
| ... | ... |

507

| input.fileType | |
|---|---|
| txt | (1,0,0,0,...) |
| pdf | (0,1,0,0,...) |
| docx | (0,0,1,0,...) |
| pptx | (0,0,0,1,0,...) |
| ... | ... |

508

| output.fileType | |
|---|---|
| txt | (1,0,0,0,...) |
| pdf | (0,1,0,0,...) |
| docx | (0,0,1,0,...) |
| pptx | (0,0,0,1,0,...) |
| ... | ... |

Trained model information (copy) 510

| Tenant ID (511) | User ID (512) | Job type (513) | Trained model file path (514) |
|---|---|---|---|
| * | * | copy | /all_copy.model<br>/all_input.colorMode.model<br>/all_output.colorMode.model<br>/all_layout.model<br>/all_paperside.model<br>/all_input.paperSize.model<br>/all_output.paperSize.model |
| tenant0001 | * | copy | /tenant0001_copy.model<br>/tenant0001_input.colorMode.model<br>/tenant0001_output.colorMode.model<br>/tenant0001_layout.model<br>/tenant0001_paperside.model<br>/tenant0001_dpi.model |
| tenant0001 | user1111 | copy | /tenant0001_user1111_copy.model<br>/tenant0001_user1111_input.colorMode.model<br>/tenant0001_user1111_output.colorMode.model<br>/tenant0001_user1111_layout.model<br>/tenant0001_user1111_paperside.model<br>/tenant0001_user1111_dpi.model<br>/tenant0001_user1111_input.paperSize.model<br>/tenant0001_user1111_output.paperSize.model |
| tenant0002 | * | copy | /tenant0002_copy.model<br>/tenant0002_input.colorMode.model<br>/tenant0002_output.colorMode.model<br>/tenant0002_layout.model<br>/tenant0002_paperside.model<br>/tenant0002_dpi.model<br>/tenant0002_input.paperSize.model<br>/tenant0002_output.paperSize.model |

Trained model information (scan) 520

| Tenant ID (521) | User ID (522) | Job type (523) | Trained model file path (524) |
|---|---|---|---|
| * | * | scan | /all_scan.model<br>/all_input.colorMode.model<br>/all_output.colorMode.model<br>/all_layout.model<br>/all_dpi.model<br>/all_output.fileType.model |
| tenant0001 | * | scan | /tenant0001_scan.model<br>/tenant0001_input.colorMode.model<br>/tenant0001_output.colorMode.model<br>/tenant0001_layout.model<br>/tenant0001_dpi.model<br>/tenant0001_output.fileType.model |
| tenant0001 | user1111 | scan | /tenant0001_user1111_scan.model<br>/tenant0001_user1111_input.colorMode.model<br>/tenant0001_user1111_output.colorMode.model<br>/tenant0001_user1111_layout.model<br>/tenant0001_user1111_output.fileType.model |
| tenant0002 | * | scan | /tenant0002_scan.model<br>/tenant0002_input.colorMode.model<br>/tenant0002_output.colorMode.model<br>/tenant0002_layout.model<br>/tenant0002_dpi.model<br>/tenant0002_output.fileType.model |

Trained model information (print) 530

| Tenant ID (531) | User ID (532) | Job type (533) | Trained model file path (534) |
|---|---|---|---|
| * | * | print | /all_print.model<br>/all_output.colorMode.model<br>/all_layout.model<br>/all_paperSide.model<br>/all_output.paperSize.model<br>/all_input.fileType.model |
| tenant0001 | * | print | /tenant0001_print.model<br>/tenant0001_output.colorMode.model<br>/tenant0001_layout.model<br>/tenant0001_paperSide.model<br>/tenant0001_output.paperSize.model |
| tenant0001 | user1111 | print | /tenant0001_user1111_print.model<br>/tenant0001_user1111_output.colorMode.model<br>/tenant0001_user1111_layout.model<br>/tenant0001_user1111_paperSide.model<br>/tenant0001_user1111_input.fileType.model |
| tenant0002 | * | print | /tenant0002_print.model<br>/tenant0002_output.colorMode.model<br>/tenant0002_layout.model<br>/tenant0002_paperSide.model<br>/tenant0002_output.paperSize.model<br>/tenant0002_input.fileType.model |

FIG.6

Trained model information 610

| Tenant ID 611 | User ID 612 | Job type 613 | Trained model file path 614 |
|---|---|---|---|
| * | * | copy | /all_copy.model<br>/all_input.colorMode.model<br>/all_output.colorMode.model<br>/all_layout.model<br>/all_paperside.model<br>/all.dpi.model<br>/all_input.paperSize.model<br>/all_output.paperSize.model |
| tenant0001 | * | copy | /tenant0001_copy.model<br>/tenant0001_input.colorMode.model<br>/tenant0001_output.colorMode.model<br>/tenant0001_layout.model<br>/tenant0001_paperside.model<br>/tenant0001_input.paperSize.model<br>/tenant0001_input.paperSize.model<br>/tenant0001_output.paperSize.model |
| tenant0001 | user1111 | copy | /tenant0001_user1111_copy.model<br>/tenant0001_user1111_input.colorMode.model<br>/tenant0001_user1111_output.colorMode.model<br>/tenant0001_user1111_layout.model<br>/tenant0001_user1111_paperside.model<br>/tenant0001_user1111_dpi.model<br>/tenant0001_user1111_input.paperSize.model<br>/tenant0001_user1111_output.paperSize.model |

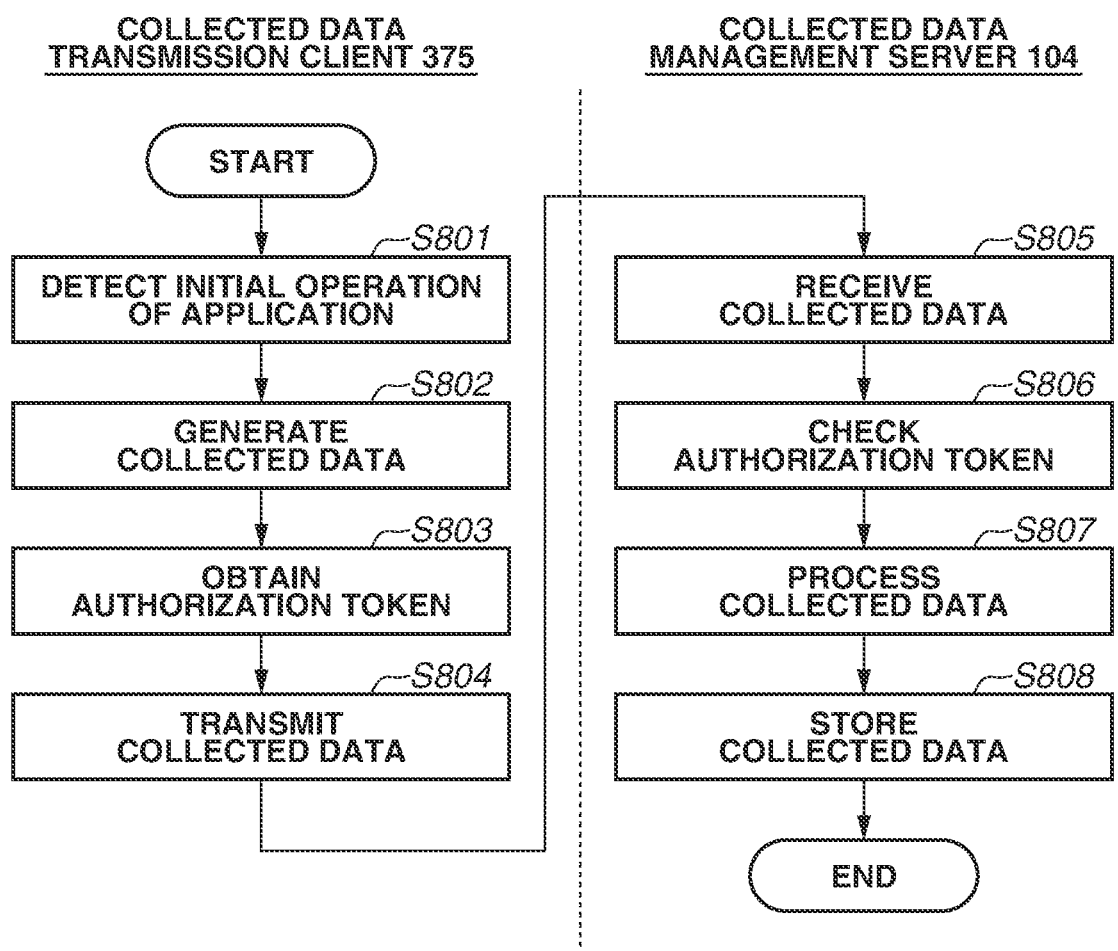

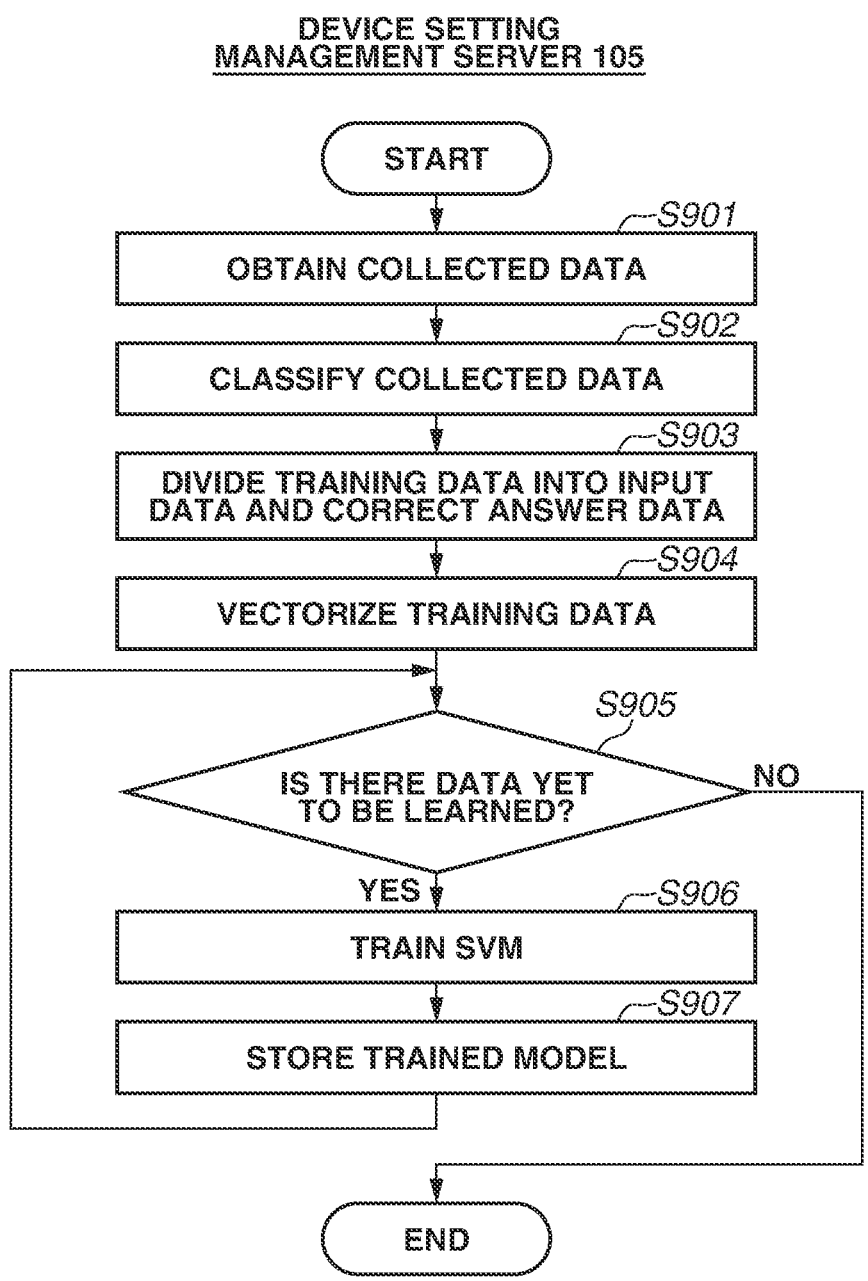

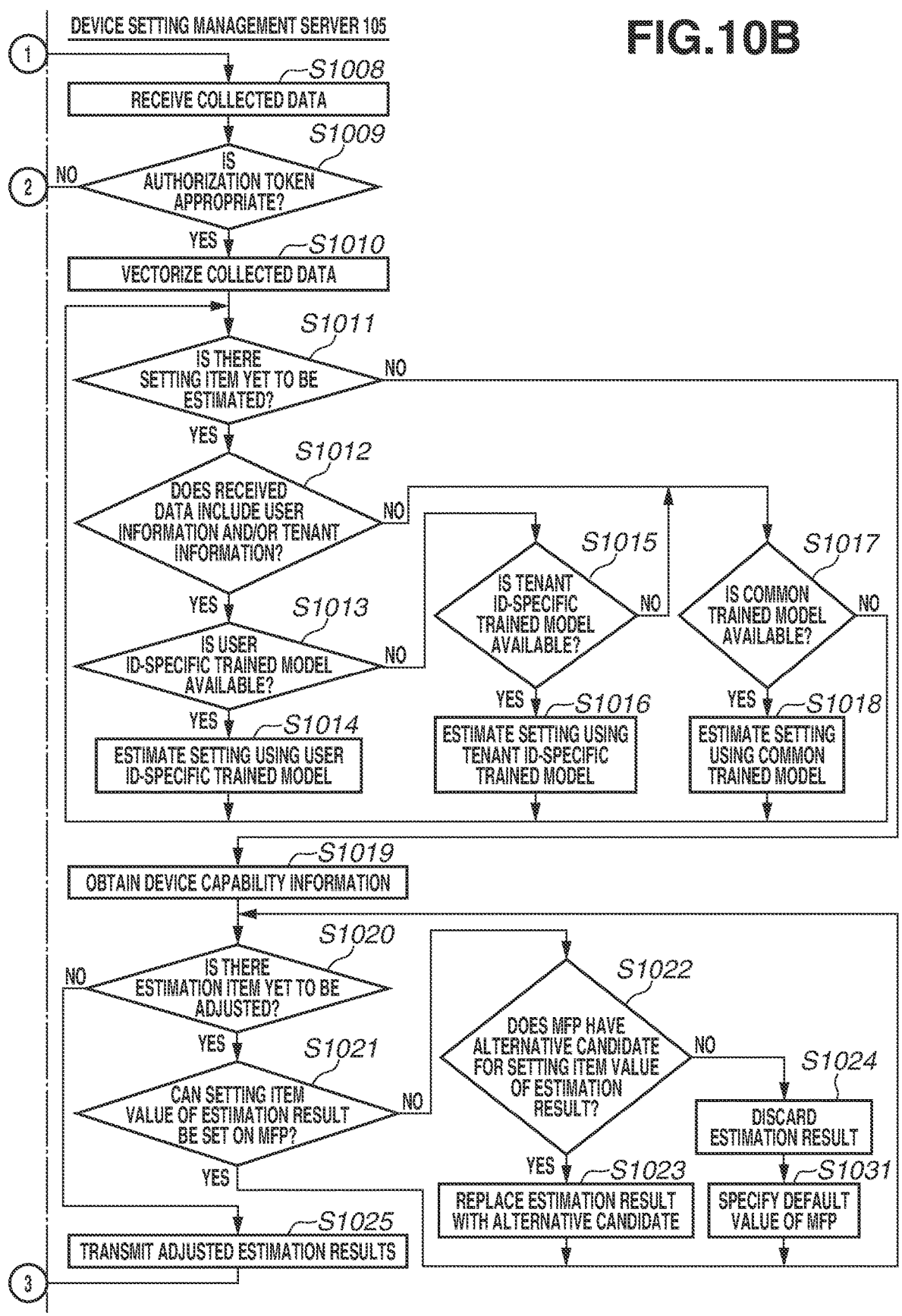

Copy

Copy is normally available now. — *1101*

Document information
- Document size: A4
- Number of pages of document: 10

*1102*

☐ Estimate settings — *1104*

Copy setting information — *1103*
- Color setting: Color
- Number of copies: 1
- Two-sided/one-sided: One-sided
- Size of copy paper: A4
- Layout setting: 1 in 1

Copy

Copy is normally available now.
Settings suitable for the copy document have been applied. — *1111*

Document information
- Document size: A4
- Number of pages of document: 10

*1112*

☑ Estimate settings — *1114*

Copy setting information — *1113*
- Color setting: Monochrome
- Number of copies: 1
- Two-sided/one-sided: Two-sided
- Size of copy paper: A4
- Layout setting: 1 in 2

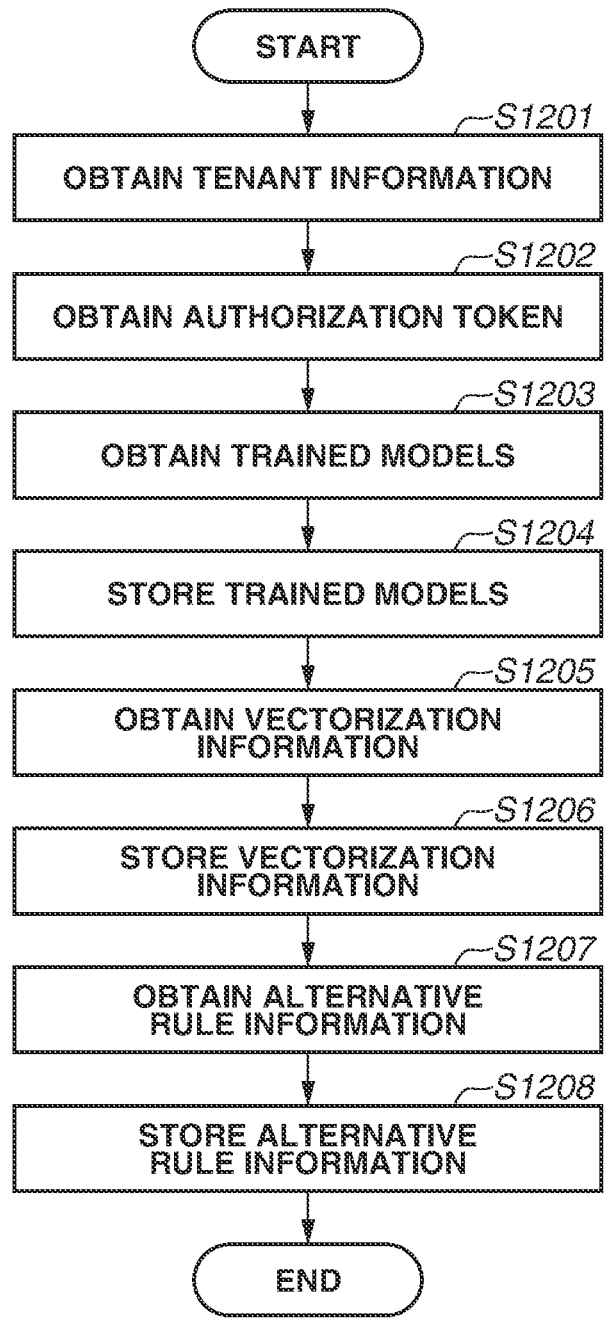

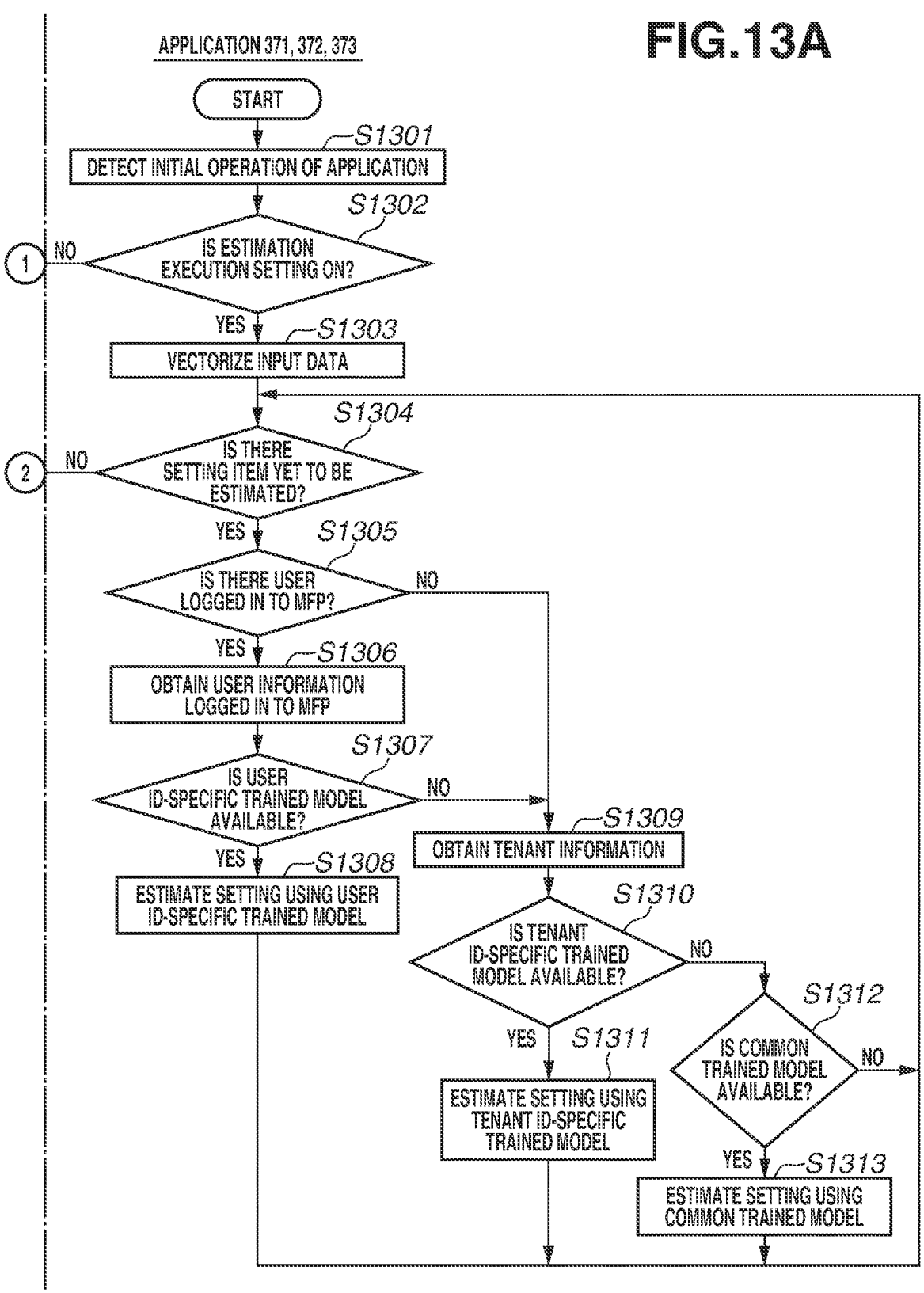

FIG.14

Alternative rule information (copy) 1410

| Tenant ID (1411) | User ID (1412) | Job type (1413) | Setting value (1414) | Alternative rule (1415) |
|---|---|---|---|---|
| * | * | copy | input.dpi | Ascending |
| tenant0001 | * | copy | input.dpi | Ascending |
| tenant0001 | user1111 | copy | input.dpi | Descending |
| tenant0002 | * | copy | input.dpi | Descending |
| * | * | copy | output.colorMode | 1:mono,2:color |
| tenant0001 | * | copy | output.colorMode | 1:color,2:mono |
| tenant0001 | user1111 | copy | output.colorMode | 1:color |
| tenant0002 | * | copy | output.colorMode | 1:mono,2:color |

Alternative rule information (scan) 1420

| Tenant ID (1421) | User ID (1422) | Job type (1423) | Setting value (1424) | Alternative rule (1425) |
|---|---|---|---|---|
| * | * | scan | input.dpi | Ascending |
| tenant0001 | * | scan | input.dpi | Ascending |
| tenant0001 | user1111 | scan | input.dpi | Descending |
| tenant0002 | * | scan | input.dpi | Descending |
| * | * | scan | input.colorMode | 1:mono,2:color |
| tenant0001 | * | scan | input.colorMode | 1:color,2:mono |
| tenant0001 | user1111 | scan | input.colorMode | 1:color,2:mono |
| tenant0002 | * | scan | input.colorMode | 1:mono,2:color |

Alternative rule information (print) 1430

| Tenant ID (1431) | User ID (1432) | Job type (1433) | Setting value (1434) | Alternative rule (1435) |
|---|---|---|---|---|
| * | * | print | output.colorMode | 1:mono,2:color |
| tenant0001 | * | print | output.colorMode | 1:color,2:mono |
| tenant0001 | user1111 | print | output.colorMode | 1:color,2:mono |
| tenant0002 | * | print | output.colorMode | 1:mono,2:color |
| * | * | print | paperSide | 1:2Sided,2:1Sided |
| tenant0001 | * | print | paperSide | 1:1Sided,2:2Sided |
| tenant0001 | user1111 | print | paperSide | 1:2Sided,2:1Sided |
| tenant0002 | * | print | paperSide | 1:1Sided,2:2Sided |

FIG.15

Copy application default setting information 1510

| Device ID 1511 | Tenant ID 1512 | User ID 1513 | Job type 1514 | Setting value 1515 | Default value 1516 |
|---|---|---|---|---|---|
| Device0001 | * | * | copy | input.dpi | 200 |
| | | | | input.colorMode | mono |
| | | | | input.paperSize | A4 |
| | | | | output.colorMode | mono |
| | | | | output.paperSize | A4 |
| | | | | paperSide | 1Sided |
| | | | | ... | ... |
| Device0001 | tenant0001 | * | copy | input.dpi | 200 |
| | | | | input.colorMode | mono |
| | | | | input.paperSize | A4 |
| | | | | output.colorMode | mono |
| | | | | output.paperSize | A4 |
| | | | | paperSide | 1Sided |
| | | | | ... | ... |
| Device0001 | tenant0001 | user1111 | copy | input.dpi | 400 |
| | | | | input.colorMode | mono |
| | | | | input.paperSize | A4 |
| | | | | output.colorMode | color |
| | | | | output.paperSize | A4 |
| | | | | paperSide | 2Sided |
| | | | | ... | ... |

SYSTEM FOR ESTIMATING A SETTING VALUE USING A TRAINED MODEL GENERATED BY COLLECTING DATA ON A DEVICE

CROSS-REFERENCE TO RELATED APPLICATIONS

This application is a Continuation of International Patent Application No. PCT/JP2020/000459, filed Jan. 9, 2020, which claims the benefit of Japanese Patent Application No. 2019-007010, filed Jan. 18, 2019, both of which are hereby incorporated by reference herein in their entirety.

BACKGROUND OF THE INVENTION

Field of the Invention

The present invention relates to a system that uses an estimate made by using a trained model for application setting, a method for controlling the same, and a storage medium.

Background Art

Cloud computing (hereinafter, referred to as the cloud for short) has been increasingly prevalent in recent years.

As the cost of computing resources and operations decreases daily service developers can concentrate more and more on the development of core functions through the use of the cloud.

The prevalence of the cloud is also accelerating widespread use of artificial intelligence (AI). One of the core techniques for implementing AI is machine learning. Machine learning is a technique for extracting data features by analyzing a large amount of data called big data, using a predetermined learning algorithm. It is essential, for the analysis to produce a certain outcome, to procure enough storage to store huge volumes of data for a long time and sufficient computer resources to analyze the data by a learning algorithm in as short a period as possible. In this view, the cloud capable of providing needed amounts of computing resources and storage when needed in a flexible manner in terms of cost and in terms of speed has a high affinity for machine learning.

In the field of multifunctional peripherals (MFPs), functions using AI for the development of services cooperative with MFPs are also increasing. PTL1 discusses a technique for collecting and learning operation logs of an MFP user by user, and estimating an operation subsequent to a selected operation and providing a screen display to improve the convenience of the MFP when the users operate the MFP.

According to the conventional technique, the operation logs of respective users are learned multifunctional peripheral (MIT) by MFP. However, the users do not necessarily continue to use the same device. For example, in some environment, there can be a plurality of MFPs usable by one user in an office and the like. MFPs have individual differences due to performance and the like, and there is no guarantee that an estimated result necessarily is applicable to all the MFPs.

An object of the present invention is to enable appropriate application settings, in a system where an estimated result made by using trained models are used as the application settings, by adjusting the estimated result based on a device-related rule.

Citation List

Patent Literature

PTL1: Japanese Patent Application Laid-Open No. 2018-99817

SUMMARY OF THE INVENTION

A system according to one exemplary embodiment of the present invention is for generating a trained model by performing training based on collected data on a device, and making an estimate using the generated trained model. The system includes obtaining unit configured to obtain device information about the device, the device serving as a destination for which a setting value estimated by using the trained model is provided, determination unit configured to determine whether the estimated setting value is settable on the device based on the device information obtained by the obtaining unit, and adjustment unit configured to adjust, if the determination unit determines that the estimated setting value is unable to be set, the estimated setting value. The device used by a user displays the setting value adjusted by the adjustment unit as a setting value related to device processing.

Further features of the present invention will become apparent from the following description of exemplary embodiments with reference to the attached drawings.

BRIEF DESCRIPTION OF THE DRAWINGS

FIG. 4B is a diagram illustrating collected data information.
FIG. 5A is a block diagram illustrating data information stored in a device setting management server 105.
FIG. 5B is a diagram illustrating data information stored in a device setting management server 105.
FIG. 6 is a block diagram illustrating data information stored in an authorization client 374 and applications 371, 372, and 373.
FIG. 8 is a flowchart illustrating an outline of a series of processing flows of data collection, training, and estimation.
FIG. 9 is a detailed flowchart of training performed by the device setting management server 105.
FIGS. 10A and 10B illustrate a detailed flowchart of estimation by the device setting management server 105.
FIG. 11A is a block diagram illustrating contents displayed on an operation panel 207.
FIG. 11B is a block diagram illustrating contents displayed on an operation panel 207.
FIG. 12 is a detailed flowchart where a multifunctional peripheral (MFP) 102 obtains trained models.
FIGS. 13A and 13B illustrate a detailed flowchart of estimation performed by the MFP 102.

FIG. 14 is a block diagram illustrating a data structure of alternative rule information.

FIG. 15 is a block diagram illustrating a data structure of application default setting information.

DESCRIPTION OF THE EMBODIMENTS

Modes for carrying out the present invention will be described below with reference to the drawings.

First Exemplary Embodiment

In the present exemplary embodiment, applications are installed on servers on the Internet. The applications provide various functions in cooperation with a multifunctional peripherals (MFP). The entities that provide such functions will be referred to as services, and providing a function for an MFP will be referred to as provision of a service.

Figure 1:
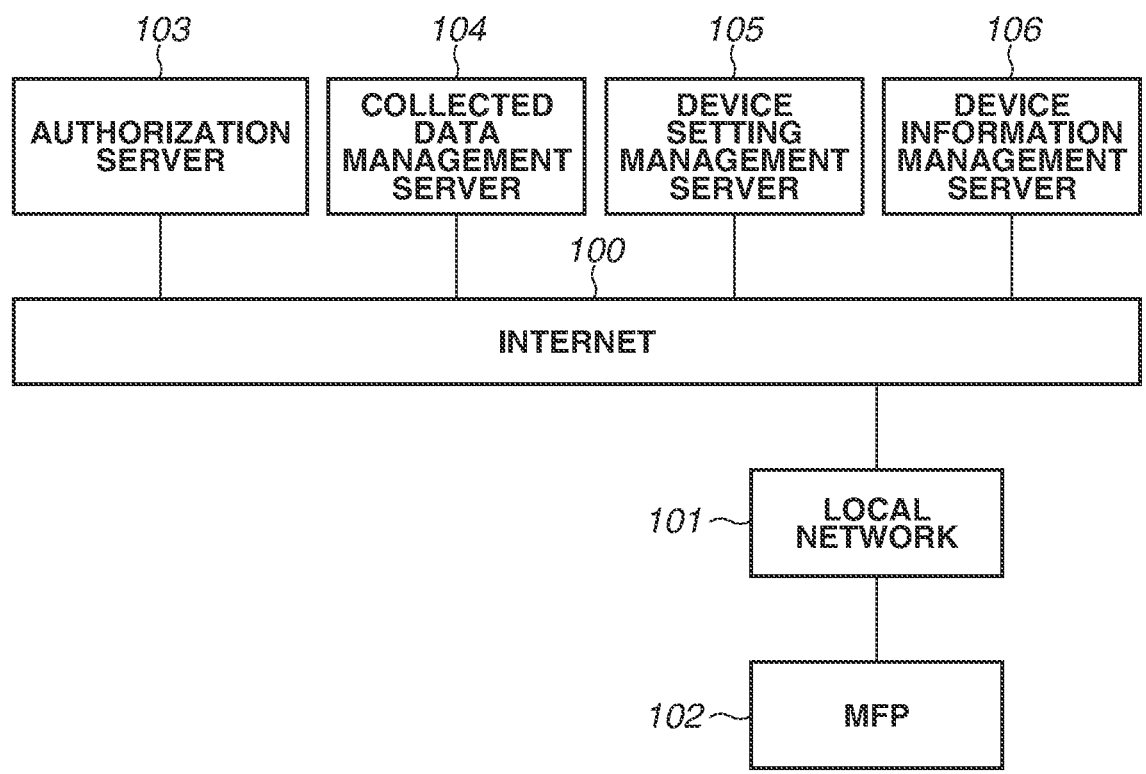
FIG. 1 is an overall system diagram.

FIG. 1 is a block diagram illustrating an overall configuration of a setting estimation system according to the present exemplary embodiment. The Internet 100 is a public network connecting components of the present system. A local network 101 is a local area network (LAN) connecting the components of the present system.

An MFP 102 is a client terminal that uses services described in the present exemplary embodiment. The MFP 102 can connect to the Internet 100 via the local network 102 and receive services from servers 103 to 106.

An authorization server 103 is a server for implementing Open Authorization (OAuth). The authorization server 103 manages client information, and issues and manages authorization tokens. A collected data management server 104, a device setting management server 105, and a device information management server 106 belong to a security domain of the authorization server 103. An authorization token issued by the authorization server 103 is needed for the MFP 102 to receive the provision of services from the servers belonging to the security domain of the authorization server 103. The MFP 102 receives the provision of services from the servers on the cloud only if the validity of the authorization token is confirmed by the authorization server 103. The validity check of an authorization token by the authorization server 103 includes processing, such as an expiration date check and a license check.

The collected data management server 104 is a server for managing data transmitted from the MFP 102. The MFP 102 generates data on events occurring in the MFP 102 and transmits the data to the collected data management server 104. The collected data management server 104 receives and store the data from the MFP 102.

The device setting management server 105 is a server for managing settings used in the MFP 102. In the present exemplary embodiment, the device setting management server 105 analyzes and learns the settings of a copy function, a scan function, and a print function of the MFP 102 based on collected data stored in the collected data management server 104. The device setting management server 105 or the MFP 102 estimates settings corresponding to the respective device functions based on the result of learning by the device setting management server 105.

The device information management server 106 is a server for managing model information about the MFP 102. The MFP 102 has different functions and different values settable for the functions depending on the model of the MFP 102. The device information management server 106 is a server for managing such function information, setting information, and the like that vary depending on the model of the MFP 102. In the present exemplary embodiment, the device setting management server 105 evaluates and adjusts estimated settings by using the data stored in the device information management server 106.

In FIG. 1, for simple description of the present exemplary embodiment, the MFP 102 and the servers 103 to 106 are each illustrated to be configured by a single unit. However, the numbers of units are not limited. Each component may include a plurality of units. Moreover, while the description is given by using the MFP 102 as an example, the device is not limited to an MFP.

Figure 2A:
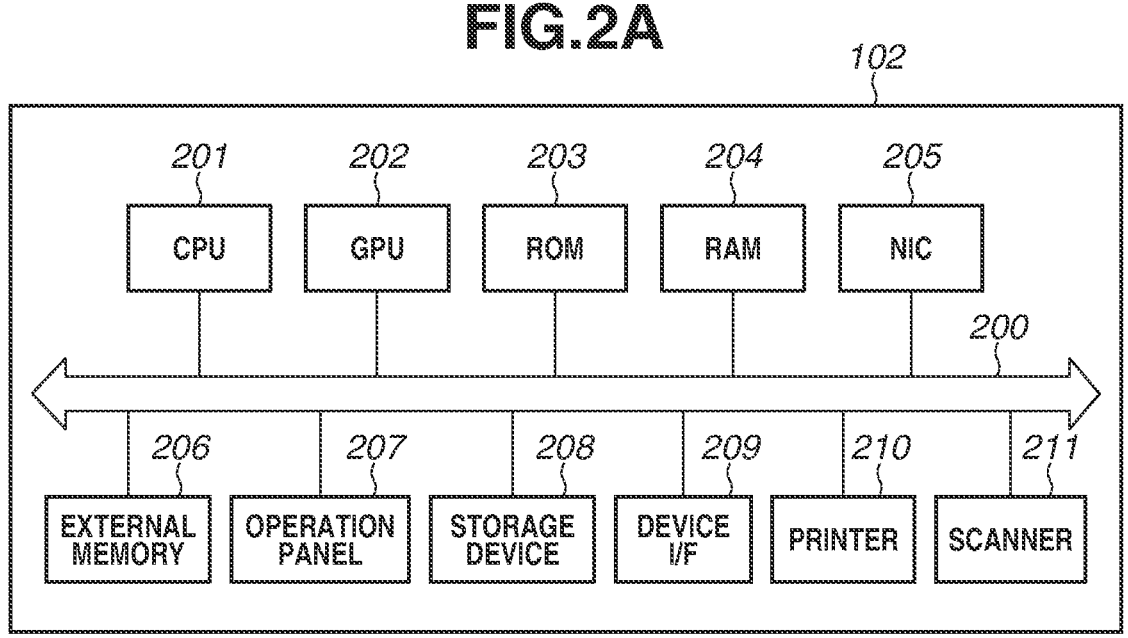
FIG. 2A is a hardware configuration diagram.
Figure 2B:
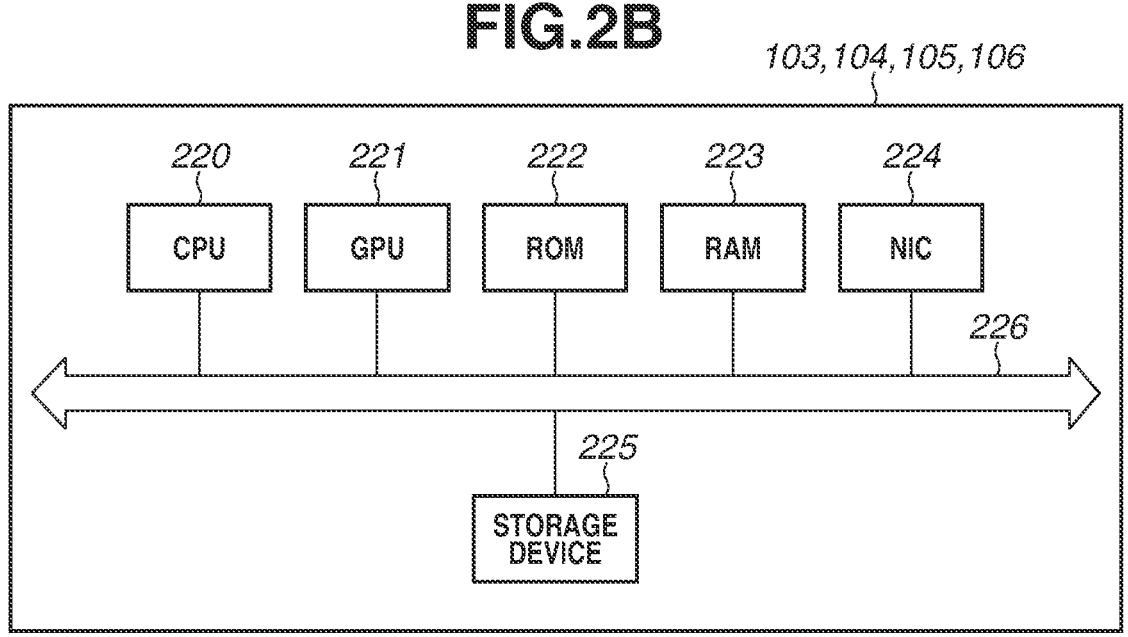
FIG. 2B is a hardware configuration diagram.

FIGS. 2A and 2B illustrate block diagrams of a hardware configuration of the apparatuses constituting the setting estimation system according to the present exemplary embodiment. FIG. 2A is a block diagram illustrating an example of the hardware configuration of the MFP 102. The hardware components are connected to a system bus 200.

A CPU 201 is a central processing unit (CPU) for controlling the entire apparatus, and controls access to various devices connected to the system bus 200 in an integrated manner. The control is based on a control program and the like stored in a read only memory (ROM) 203, or a control program, resource data (resource information), and the like stored in an external memory 206 connected via a disk controller (not illustrated).

A graphic processing unit (CPU) 202 is an arithmetic unit specialized in image processing and vector operations, such as machine learning. The ROM 203 is a ROM that is a storage unit. The ROM 203 stores programs, such as a basic input/output (I/O) program, and various types of data e.g., font data used during document processing inside. A random access memory (RAM) 204 is a RAM that is a temporary storage unit. The RAM 204 is a RAM functioning as, for example, a main memory, and a work area, of the CPU 201 and the GPU 202, and is configured such that its memory capacity can be extended by an option RAM connected to a not-illustrated extension port.

An NIC 205 is a network interface card (hereinafter, abbreviated as NIC), and the NIC 205 exchanges data with an external apparatus. The external memory 206 is an external storage device that lies inside the MFP 102 and is connected and controlled via the disk controller (not illustrated).

An operation panel 207 is an operation unit for displaying an operation screen of the MFP 102 and accepting a user's operation instructions via a screen. The operation panel 207 also includes hardware buttons and a display unit, such as a liquid crystal panel, for, for example, setting an operation mode and the like of the MFP 102, displaying an operation status of the MFP 102, and operating various functions.

A storage device 208 is an external storage unit. The storage device 208 is an external storage unit functioning as a mass memory, and stores a program according to the present invention. A device interface (hereinafter, abbreviated to device I/F) 209 is a connection I/F with an external device connectable by, for example, a universal serial bus (USB).

A printer 210 uses an existing printing technique. Examples of suitable implementation systems include an electrophotographic (laser beam) system, an inkjet system, and a sublimation (thermal transfer) system. The printer 210 discharges a sheet on which an image of image data converted from print data (e.g., a paper description language (PDL) and a portable document format (PDF)) is printed. A scanner 211 uses an existing image reading technique. The scanner 211 optically scans a paper document placed on a transparent platen and converts the paper document into image data. The scanner 211 continuously reads a plurality of paper documents placed in an automatic document feeder (ADF) and converts the paper documents into image data.

Some models of MFPs 102 do not include the printer 210 and/or the scanner 211 as their components. In the present exemplary embodiment, the model information managed by the device information management server 106 includes information indicating the presence or absence of the printer 210 and the scanner 211.

FIG. 2B is a block diagram illustrating an example of the hardware configuration of the servers 103 to 106. The present invention is applicable to both a single device and a system including a plurality of devices as long as the functions of the present invention can be implemented, unless otherwise specified. The present invention is also applicable to a system where connections are made and processing is performed via a network, such as a LAN and a WAN, as long as the functions of the present invention can be implemented, unless otherwise specified. In the present exemplary embodiment, the components will be described as being connected by a system bus 226.

A CPU 220 is a CPU that is a control unit of the information processing apparatus, and the CPU 220 executes an application program and an operating system of the servers 103 to 106 stored in a ROM 222 or a storage device 225. The CPU 220 also performs control to temporarily store, for example, information and files, needed for program execution into a RAM 223.

A GPU 221 is an arithmetic unit specialized in image processing and vector operations, such as machine learning. The ROM 222 is a ROM that is a storage unit. The ROM 222 stores programs, such as a basic I/O program, and various types of data, such as font data used during document processing, inside. The RAM 223 is a RAM that is a temporary storage unit. The RAM 223 functions as, for example, a main memory, and a work area, of the CPU 220 and the GPU 221.

A NIC 224 is a network interface card (hereinafter, abbreviated as NIC), and exchanges data with an external device. The storage device 225 is an external storage device. The storage device 225 is a storage device functioning as a mass memory, and stores programs according to the present invention, such as an application program and an operating system (OS).

FIGS. 3A to 3E illustrate block diagrams of an example of a software configuration of the components of the setting estimation s stem according to the present exemplary embodiment. The software modules of the MFP 102 are stored in the ROM 203 or the storage device 208 illustrated in FIG. 2A, loaded into the RAM 204 by the CPU 201, and executed by the CPU 201 and/or the GPU 202. The software modules of each server are stored in the ROM 222 or the storage device 225 illustrated in FIG. 2B, loaded into the RAM 223 by the CPU 220, and executed by the CPU 220 and/or the GPU 221.

Figure 3A:
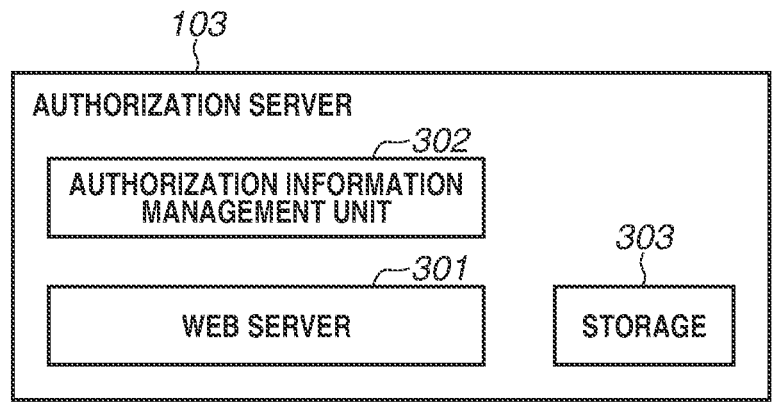
FIG. 3A is a software configuration diagram.

FIG. 3A is a block diagram illustrating an example of the software configuration of the authorization server 103. A web server 301 provides various interfaces of the authorization server 103, and checks the validity of information accepted from the MFP 102 or the server 104, 105, or 106.

An authorization information management unit 302 manages the client information and authorization token information. The authorization information management unit 302 issues an authorization token, checks a scope, checks expiration date, etc., based on a request accepted by the web server 301. A storage 303 stores information for the authorization server 103 to store and manage, such as the client information and the authorization token information.

Table 1 illustrates a data table of the client information that the authorization server 103 stores in the storage 303.

TABLE 1

Client Information Table (Authorization Server 103)

| Client ID | Password | Device ID | Tenant ID |
|---|---|---|---|
| Client0001 | ******* | Device0001 | tenant0001 |
| Client0002 | ******** | Device0002 | tenant0002 |
| Client0003 | ******** | | |
| Client0004 | ******** | | |

The authorization server 103 manages information about clients that can access the servers 104, 105, and 106 in the client information table. A client ID column stores identifiers for uniquely identifying the clients. A password column stores passwords for determining the authenticity of the clients. The authorization server 103 identifies a client transmitting a request to the servers 104, 105, and 106 based on a match with the values in the client ID column and the values in the password column. A device ID column stores a device ID that is the identifier of an MFP 102 in a case There the client is the MFP 102. A tenant ID column stores an identifier of a company, an organization, or the like using the client.

Table 2 illustrates a data table of the authorization token information that the authorization server 103 stores in the storage 303.

TABLE 2

Authorization Token Information Table (Authorization Server 103)

| Authorization token | Expiration date | Scope | Client ID |
|---|---|---|---|
| AT_0001 | 2016 Dec. 31 15:02:01.196 | PutDeviceData | Client0001 |
| AT_0002 | 2017 Jan. 1 09:32:11.034 | PutDeviceData | Client0002 |
| AT_0003 | 2017 Jan. 1 15:02:02.120 | GetDeviceSetting | Client0001 |
| AT_0004 | 2017 Jan. 2 02:24:53.659 | GetDeviceSetting | Client0002 |

The authorization server 103 manages authorization token information issued in accepting an authorization token acquisition request from a client. An authorization token column stores identifiers for uniquely identifying authorization tokens issued by the authorization server 103. An expiration date column stores time information obtained by adding a time defined as an expiration period of an authorization token to the time when the authorization token acquisition request is received by the authorization server 103. The authorization server 103 determines an authorization token of which the expiration date stored in the expiration date column has elapsed to be invalid.

A scope column stores OAuth scopes. A scope indicates the range of resources accessible from a client column. The scope is where the authorization token can be used, and one scope to be passed to the client by the authorization token acquisition request to the authorization server 103 is registered. In the first exemplary embodiment, for example, PutDeviceData is used as a scope where collected data can be transmitted to the collected data management server 104, and GetDeviceSetting is used as a scope where vectorization information and trained model information can be obtained from the device setting management server 105.

The client IDs of clients transmitting an authorization token acquisition request to the authorization server 103 are registered in a client ID. The data tables illustrated in Tables 1 and 2 may be configured to be distributedly stored in other servers capable of communication via the Internet 100 and the local network 101, instead of the storage 303 of the authorization server 103.

Figure 3B:
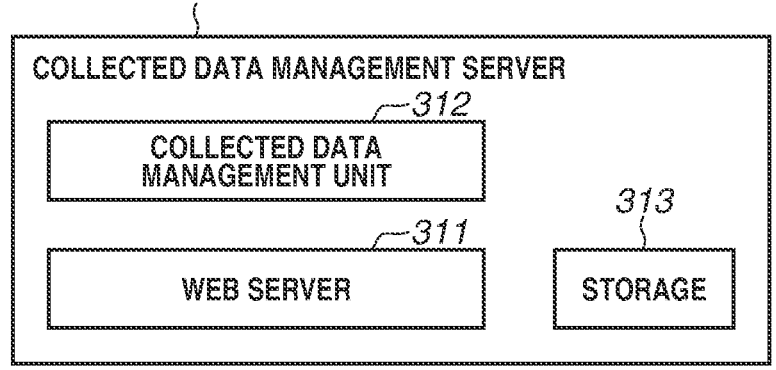
FIG. 3B is a software configuration diagram.

FIG. 3B is a block diagram illustrating an example of the software configuration of the collected data management server 104. A web server 311 provides various interfaces of the collected data management server 104, and checks the validity of information accepted from the MFP 102 or the device setting management server 105. A collected data management unit 312 manages collected data information. The collected data management unit 312 stores collected data accepted by the web server 311. A storage 313 stores information, such as the collected data information, that the collected data management server 104 stores and manages.

Figure 3C:
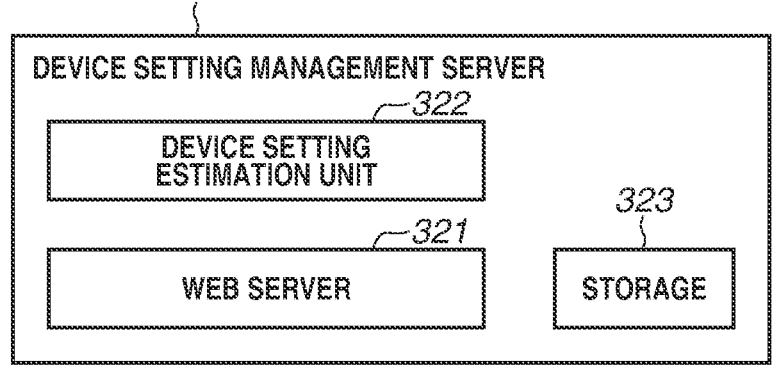
FIG. 3C is a software configuration diagram.

FIG. 3C is a block diagram illustrating an example of the software configuration of the device setting management server 105. A web server 321 provides various interfaces of the device setting management server 105, and checks the validity of information accepted from the MFP 102. A device setting estimation unit 322 manages vectorization information 500 and trained model information 510, 520, and 530. The device setting estimation unit 322 generates trained model information for estimating device settings corresponding to the respective functions of the MFP 102 by performing machine learning on the collected data on the MFP 102, collected by the collected data management server 104.

The device setting estimation unit 322 also obtains device model information from the device information management server 106, and adjusts the device settings estimated by using the trained model information. The device setting estimation unit 322 also provides the vectorization information 500 and the trained model information 510, 520, and 530 to the MFP 102. A storage 323 stores information for the device setting management server 105 to store and manage, such as the vectorization information and the trained model information.

Figure 3D:
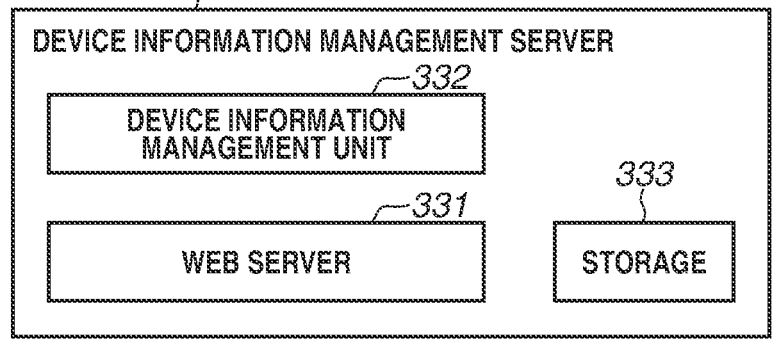
FIG. 3D is a software configuration diagram.

FIG. 3D is a block diagram illustrating an example of the software configuration of the device information management server 106. A web server 331 provides various kinds of interfaces of the device information management server 106, and checks the validity of information accepted from the MFP 102 or the device setting management server 105. A device information management unit 332 manages device Model information. The device information management unit 332 stores device model information accepted from the MFP 102 by the web server 331. A storage 333 stores information, such as the device model information, that the device information management server 106 stores and manages.

Table 3 illustrates a data table of the device model information that the device information management server 106 stores in the storage 333.

TABLE 3

Device Information Management Table (Device Information Management Server 106)

| Model type | Function name | Setting item name | Setting item value |
|---|---|---|---|
| Type A | Scan | input.colorMode | color, mono |
| | | input.dpi | 100, 200, 300, 400, 500 |
| | | input.paperSize | A3, A4 |
| | | output.colorMode | color, mono |
| | | output.fileType | txt, pdf, jpg |
| | Copy | input.colorMode | color, mono |
| | | input.dpi | 100, 200, 300, 400, 500 |
| | | input.PaperSize | A3, A4 |
| | | output.colorMode | color, mono |
| | | output.layout | 1 in 1, 2 in 1, 4 in 1 |
| | | output.paperSide | 1 Sided, 2 Sided |
| | | output.paperSize | A3, A4 |
| | Print | input.fileType | txt, pdf, jpg |
| | | output.colorMode | color, mono |
| | | output.layout | 1 in 1, 2 in 1, 4 in 1 |
| | | output.paperSide | 1 Sided, 2 Sided |
| | | output.paperSize | A3, A4 |
| Type B | Scan | input.colorMode | mono |
| | | input.dpi | 100, 200, 300 |
| | | ... | ... |
| | Copy | ... | ... |
| | Print | ... | ... |
| Type C | Print | ... | ... |

The device information management server 106 manages, by using the device information management table, the functions of each model type of MFP, settable items of the functions, and ranges thereof. A model type column stores identifiers for identifying the model types of MFPs. A function name column is a column storing function categories that the models indicated by the values in the model type column have. In the present exemplary embodiment, the function categories are Scan, Copy, and Print, which respectively correspond to applications 371, 372, and 373 to be described below. However, this is not restrictive.

A setting item name column stores setting item names that the functions indicated by the values in the function name column have. A setting item value column stores a list of capability values settable for the setting items indicated by the values in the setting item name column. For example, an MFP of model type Type A has three types of functions Scan, Copy, and Print. The item input.dpi indicating the reading resolution of the Scan function indicates that the MFP has the capability of setting the resolution from 100 dpi to 600 dpi.

MFPs of model type Type A and Type B both have the Scan function. The item input.colorMode indicating the reading color setting of the Scan function of type A indicates that the MFP can perform reading with both color and monochrome settings, and that of type B indicates that the MFP can perform reading only in monochrome. Unlike other model types, the MFP of Type C is indicated to have only the Print function.

Figure 3E:
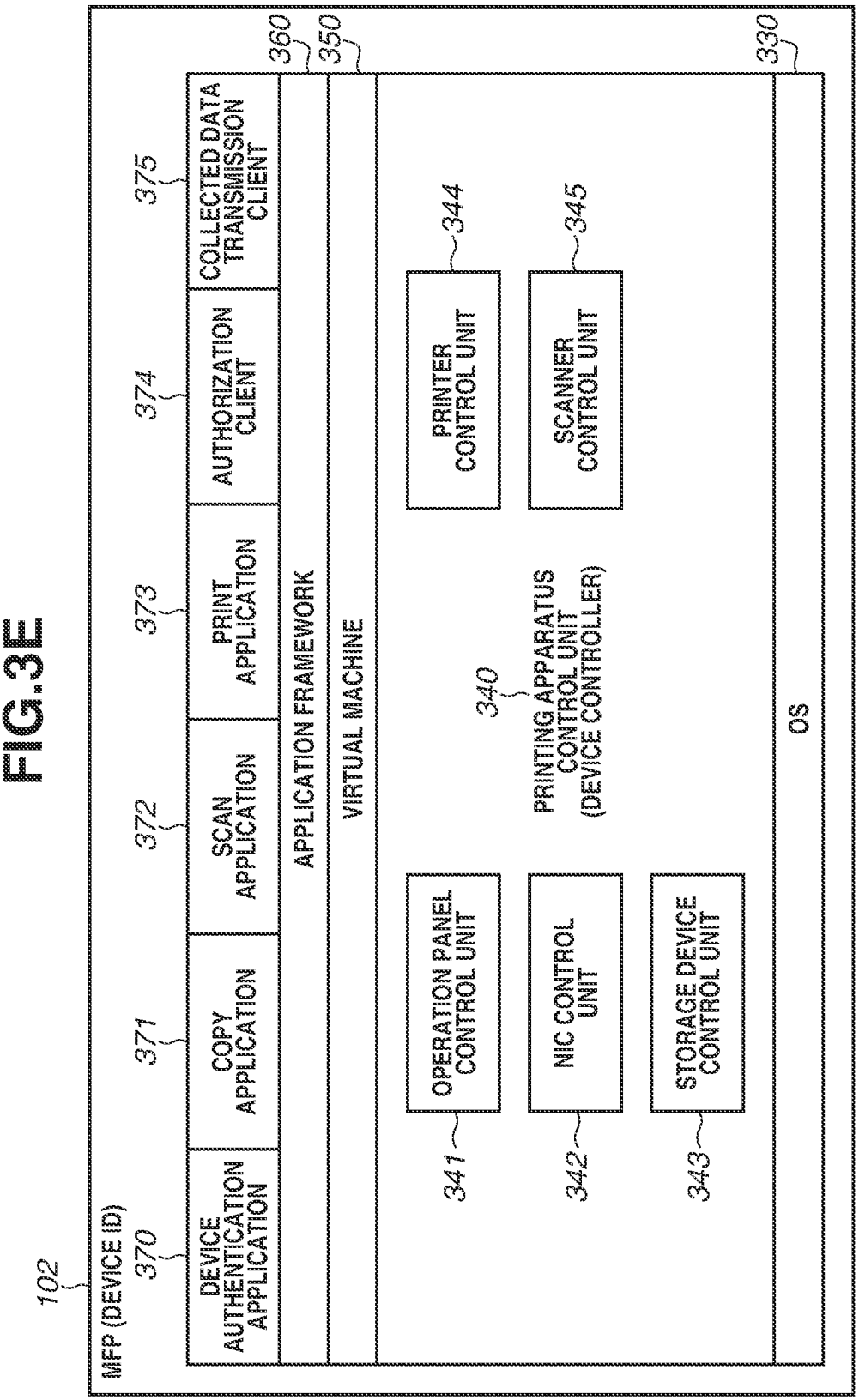
FIG. 3E is a software configuration diagram.

FIG. 3E is a block diagram illustrating an example of the software configuration of the MFP 102. A device ID that is a value unique to each MFP 102 is issued and set into the MFP 102 upon production. Each individual MFP 102 subsequently is identified by the device ID. An OS 330 is an OS. A real-time OS is typically used, whereas a general-purpose OS such as Linux® can be used as well. A printing apparatus control unit 340 is a device controller for controlling various pieces of hardware of the MFP 102 illustrated in FIG. 2A. The printing apparatus control unit 340 also performs control between modules 341 to 345, which control respective pieces of hardware. An operation panel control unit 341 controls screen display on the operation panel 207.

A NIC control unit 342 controls a communication protocol, such as TCP/IP, by using the NIC 205. A storage device control unit 343 is a disk controller for controlling I/O to and from the storage device 208. A printer control unit 344 converts accepted print data (e.g., a PDL language and a PDF language) into image data, and discharges a sheet by controlling the printer 210. A scanner control unit 345 accepts a scan instruction and converts a document into a read image by controlling the scanner 211.

A virtual machine 350 is a virtual application execution environment running as an application to be controlled by the OS. A well-known example of the virtual machine 350 is a Java® virtual machine (VM). An application framework 360 has a function of managing the life cycles of applications to be managed running on the application execution environment provided h the virtual machine 350. The application framework 360 also includes an I/F for controlling the life cycles of the applications and an I/F publication function for mediating processing requests between the applications. A life cycle refers to a state of an application, including installation, activation, deactivation, and uninstallation of the application.

The application framework 360 also provides the applications with I/Fs for controlling various pieces of hardware of the MFP 102 via the printing apparatus control unit 340. The applications running on the application framework 360 can receive print instructions and print results, obtain scan instructions and scan images, and provide screen display on the operation panel via the application framework 360. A device authentication application 370, a copy application 371, a scan application 372, a print application 373, an authorization client 374, and a collected data transmission client 375 are applications running on the application framework 360.

The device authentication application 370 is an application for managing a login to the MFP 102. The device authentication application 370 displays a login screen on the operation panel of the MFP 102, accepts a login (username and password) from a user, and performs user authentication. If the authentication is successful, the device authentication application 370 hides the login screen to make various functions of the MFP 102 usable from the operation panel. The device authentication application 370 can also be an application that can be used without user authentication. In such a case, the user can use the functions of the application without a login.

The device authentication application 370 publishes an I/F for obtaining a user ID of the user logged in to the MFP 102, on the application framework 360. The applications on the application framework 360 can receive a login event and obtain login information via the I/F.

The copy application 371 is an application for providing the copy function of the MFP 102. The copy application 371 instructs the scanner 211 to read a document, and prints the read image data using the printer 210. The copy application 371 displays an operation panel and accepts copy settings from the user. The copy application 371 publishes an I/F for obtaining information about a copy job on the application framework 360. The applications on the application framework 360 can receive, for example, a copy start event, and a copy end event via the I/F.

The scan application 372 is an application for providing the scan function of the MFP 102. The scan application 372 instructs the scanner 211 to read a document, and stores the read image data into the external memory 206, the storage device 208, or an external information device via the NIC 205.

The scan application 372 displays an operation panel and accepts scan settings from the user. The scan application 372 publishes an I/F for obtaining information about a scan job on the application framework 360. The applications on the application framework 360 can receive, for example, a scan start event, and a scan end event via the I/F.

The print application 373 is an application for providing the print function of the MFP 102. The print application 373 reads image data stored in the external memory 206 or the storage device 208, or image data received from an external information device via the NIC 205, and prints the image data using the printer 210.

The print application 373 also displays an operation panel and accepts print settings from the user. The print application 373 publishes an I/F for obtaining information about a print job on the application framework 360. The applications on the application framework 360 can receive, for example, a print start event, and a print end event via the I/F.

The authorization client 374 is a client application of the authorization server 103. When a tenant is registered, the authorization client 374 obtains client information from the authorization server 103. Tenants are created in units of groups by which a plurality of users in a company, organization, or the like is managed, and are identified by tenant IDs.

The authorization server 103 registers a tenant in the authorization client 374 by the user inputting the tenant's one-time password issued from the authorization server 103 in advance into a screen of the authorization client 374. The authorization client 374 obtains an authorization token from the authorization server 103, and provides the authorization token to the copy application 371, the scan application 372, the print application 373, and the collected data transmission client 375.

The collected data transmission client 375 detects an event occurring in the MFP 102, and transmits event information to the collected data management server 104. Events for the collected data transmission client 375 to detect include activation, deactivation, and sleep events of the MFP 102, and user login and logout events. The collected data transmission client 375 detects the events occurring in the MFP 102 (the printing apparatus control unit 340 and the applications 370, 371, 372, and 373) via the application framework 360.

Figure 4A:
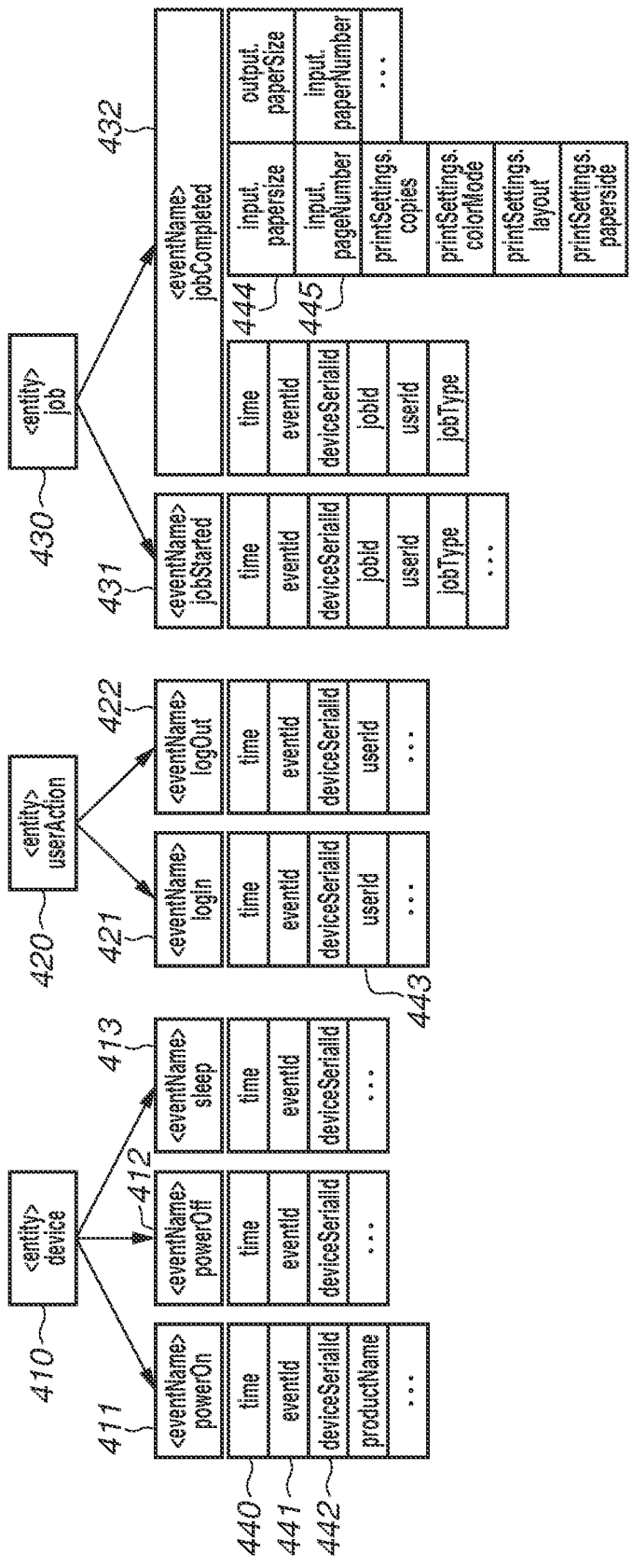
FIG. 4A is a block diagram illustrating collected data information.

FIG. 4 is a diagram illustrating an example of collected data information that the collected data management server 104 stores in the storage 313. A collected data structure 400 is a diagram illustrating a data structure of the collected data transmitted from the collected data transmission client 375 installed on the MFP 102 to the collected data management server 104.

The collected data structure 400 defines entities representing data classifications and eventName's of events occurring in the entities. Examples of entities include device 410 that is a data classification related to general operations of the MFP 102, userAction 420 related to operations made by the user on the MFP 102, and job 430 related to the processing of the functions of the MFP 102.

Device 410 includes an event powerOn 411 that occurs upon power-on of the MFP 102, an event powerOff 412 that occurs upon power-off, and an event sleep 413 that occurs upon entry to a sleep mode, UserAction 420 includes an event login 421 that occurs when the user logs in on the device authentication application 370, and an event logOut 422 that occurs when the user logs out. Job 430 includes an event jobStarted 431 that occurs when the user operates the application 371, 372, or 373 and the MFP 102 starts to execute a function, and an event jobCompleted 432 that occurs when the execution of a function is completed.

For an event, event attribute information for storing information for expressing details of the event is defined. Event attribute information includes event common attributes storing information common among events, and event individual attributes storing information about individual events.

The event common attributes include time 440, eventId 441, and deviceSerialId 442. Time 440 is an event common attribute storing the time of occurrence of the event. EventID 441 is an event common attribute storing an identifier for the collected data management server 104 to uniquely identify the event. DeviceSerialId 442 is an event common attribute storing an identifier for uniquely identifying the MFP 102 where the event has occurred.

The event individual attributes include userId 443, input.paperSize 444, and input.pageNumber 445. UserId 443 is an individual attribute of the event occurring in userAction 420, and stores an identifier of the user who has caused the event. Input.paperSize 444 is an individual attribute of the event jobCompleted 432 occurring in job 430, and stores the value of the paper size of the document to be copied by a copy job. Input.pageNumber 445 is an individual attribute of the event jobCompleted 432 occurring in job 430, and stores the number of read pages of the copy document.

The illustrated contents of the collected data structure 400 are an example expressing a part of the collected data transmitted from the collected data transmission client 375 installed on the MFP 102 to the collected data management server 104, Collected data information 450 is an example of the collected data stored in the collected data management server 104. Collected data expresses an event in a single javaScript® Object Notation (JSON) format. Keys in the JSON format of the collected data indicate the information defined by the collected data structure 400, and "value" indicates the value of the event occurred. The collected data information 450 stores collected data in a form of JSON Lines format where information on an event is stored in each line. The collected data information 450 stored in the collected data management server 104 is the collected data, to which tenantId is added, transmitted by the collected data transmission client 375. This tenantId refers to the tenant ID identified from the authorization token specified in transmitting the collected data.

The collected data information illustrated in FIG. 4B may be configured to be distributedly stored in other servers communicable via the Internet 100 and the local network 101 instead of the storage 313 of the collected data management server 104, FIGS. 5A and 5B illustrate an example of data information that the device setting management server 105 stores in the storage 323. The vectorization information 500 is mapping information for converting pieces of event attribute information included in the collected data where values are labels into vector representations capable of numerical calculation.

Input.colorMode 501 is mapping information corresponding to event attribute information expressing a color setting when the MFP 102 reads a document via the scanner 211. Input.colorMode 501 is event attribute information mostly set for an event corresponding to a copy job or a scan job. A value "color" in input.colorMode 501 is handled as "0", and a value "mono" as "1".

The values in mapping information 502 to 509 are also mapping information defined to convert event attribute information values into respective vector representations. The vector representations use One-hot expressions where only one bit is 1 and the others are 0. The One-hot expressions are uniquely assigned to the respective attributes.

The trained model information 510, 520, and 530 manages trained model information obtained as a result of machine learning on the collected data converted into vector representations based on the vectorization information 500. The models in the machine learning will be described below. The trained model information is managed with respect to each job type. The trained model information 510 manages trained model information corresponding to copy jobs, the trained model information 520 scan jobs, and the trained model information 530 print jobs.

The trained model information 510 stores the file paths of the trained models resulting from machine learning on copy jobs in a trained model file path column 514 by tenant ID 511 and by user ID 512. A stored piece of information indicated by an asterisk (*) in the trained model information column 510 represents "All". For example, the asterisk in the tenant ID 511 means that the corresponding trained model file path 514 stores file paths for trained models common among tenants.

The trained model file path 514 stores a plurality of file paths of the trained models obtained as a result of machine learning on respective pieces of event attribute information. Trained model files retained by the device setting management server 105 are stored in the storage 323, and the file paths to the storage 323 are stored in the trained model file path 514. The machine learning performed by the device setting management server 105 uses different pieces of event attribute information depending on the job type. Thus, the types stored in the trained model file path 514 also vary depending on a job type 513.

If the job type 513 is the same, the type of the file path stored in the trained model file path 514 is common within the range of event attribute information used in machine learning, even among different tenant IDs 511 or user IDs 512. Similarly, the trained model information 520 stores the file paths of the trained models resulting from machine learning on scan jobs, in a trained model file path 524 by tenant ID 521 and by user ID 522.

The trained model information 530 stores the file paths of the trained models resulting from machine learning on print jobs into the trained model file path 534 by tenant ID 531 and by user ID 532. The data information illustrated in FIGS. 5A and 5B may be configured to be distributedly stored in other servers communicable via the Internet 100 or the local network 101 instead of the storage 323 of the device setting management server 105. In such a case, the trained model file paths 514, 524, and 534 store the URLs of the servers storing the respective files.

FIG. 14 is a diagram illustrating an example of estimation result alternative rules that the device setting management server 105 stores in the storage 323. Alternative rule information 1410, 1420, and 1430 manages rules for the device setting management server 105 to adjust the estimation results of processing for estimating device setting values described below to setting values usable by the MFP 102 if the estimation results are not usable by the MFP 102.

The alternative rule information is managed with respect to each job type. The alternative rule information 1410 manages alternative rule information corresponding to copy jobs, the alternative rule information 1420 scan jobs, and the alternative rule information print jobs.

The alternative rule information 1410 manages device setting values 1414, which the device setting management server 105 estimates of copy jobs in the estimation processing described below, and the alternative rules 1415 for the device setting values 1414, for each tenant ID 1411 and for each user ID 1412, respectively. A stored piece of information indicated by an asterisk (*) in the alternative rule information 1410 represents "All". For example, an asterisk in the tenant ID 1411 means that the alternative rule 1415 that the device setting management server 105 applies to the corresponding setting value 1414 is common among users not logged in to the device. The types of device setting values for the device setting management server 105 to estimate vary depending on a job type 1413. The alternative rules also vary with the job type 1413 even if the setting values 1414 are the same.

If the value in the setting value 1414 is "input.dpi", the alternative rule 1415 can take values of "Ascending" and "Descending", Possible setting values of dpi 505 illustrated in the vectorization information 500 are consecutive numerical values. In the case of such consecutive numerical values, the alternative rule can be "Ascending" which means ascending order or "Descending" which means descending order. In the case of "Ascending", the device setting management server 105 selects a value closest to the estimated value in ascending order among the values of "input.dpi" which the MFP 102 can take as an alternative value. Specifically, if the model type of the MFP 102 illustrated in Table 3 is "Type A" and the estimated value is "350", "300" is selected as the alternative value.

In the case of "Descending", the device setting management server 105 selects a value closest to the estimated value in descending order among the values of "input.dpi" which the MFP 102 can take as an alternative value. Specifically, if the model type of the MFP 102 illustrated in Table 3 is "Type A" and the estimated value is "350", "400" is selected as the alternative value.

If the value in the setting value 1414 is not a consecutive numerical value similarly to "input.colorMode", the order of priority of possible setting values is stored in the alternative rule 1415. A value settable to the MFP 102 is set as an alternative value based on the order of priority stored in the alternative rule 1415.

Rules other than the foregoing may be stored as alternative rules. For example, a rule specifying the order of priority may be stored in the alternative rule 1415 even if possible setting values are consecutive numerical values. Similarly, the alternative rule information 1420 manages setting values 1424 corresponding to device setting value items that the device setting management server 105 estimates about scan jobs in the estimation processing described below, and the alternative rules 1425 of the setting values 1424, for each tenant ID 1421 and for each user ID 1422, respectively.

The alternative rule information 1430 manages model information 1434 corresponding to device setting value items that the device setting management server 105 estimates about print jobs in the estimation processing described below, and the alternative rules 1435 for the setting values 1434, for each tenant ID 1431 and for each user ID 1432, respectively, FIG. 6 is a diagram illustrating an example of data that the authorization client 374 and the applications 371, 372, and 373 on the MFP 102 store in the storage device 208. Table 4 illustrates a data table of the client information that the authorization client 374 manages in the storage device 208.

TABLE 4

| Client Information Table (MFP 102) | | | |
|---|---|---|---|
| Client ID | Password | Device ID | Tenant ID |
| Client0001 | ******* | Device0001 | tenant0001 |

The applications 371, 372, and 373 each obtain trained model information corresponding to the client information managed by the authorization client 374 from the device setting management server 105, and performs estimation on the MFP 102. The authorization client 374 manages its own client information registered in the authorization server 103 by using the client information table. A client ID column stores the client ID of the authorization client 374 itself.

A password column stores the password of the authorization client 374 itself.

A device ID column stores the device ID of the MFP 102 on which the authorization client 374 is installed. A tenant ID column stores the tenant ID of the authorization client 374 itself.

Trained model information 610 is data retained by the copy application 371. The copy application 371 obtains only pieces of trained model information 510 matching "All" and the tenant ID corresponding to the own MFP 102 in the client information illustrated in Table 4 from among the pieces of trained model information 510 for the job type "copy", managed by the device setting management server 105, and retains the obtained pieces of trained model information 510.

The copy application 371 similarly obtains only pieces of vectorization information 500 related to copy jobs from the device setting management server 105, and retains the obtained pieces of vectorization information 500. Examples of the vectorization information related to copy jobs include input.colorMode 501, output.colorMode 502, layout 503, paperside 504, dpi 505, input.paperSize 506, and output.paperSize 507.

The scan application 372 and the print application 373 installed on the MFP 102 similarly obtain pieces of vectorization information 500 and trained model information 520 and 530 corresponding to the respective applications and the tenant ID of the MFP 102 from the device setting management server 105, and retain the obtained pieces of vectorization information 500 and trained model information 520 and 530.

FIG. 15 is a diagram illustrating an example of default settings of the copy application 371 on the MFP 102, managed by the MFP 102. Copy application default setting information 1510 manages setting values to be displayed on the operation panel 207 to the user who uses the copy application 371 if the estimation processing is not performed or if some of the results of the estimation processing are not usable.

The copy application default setting information 1510 manages various setting values in executing a copy job for each tenant ID 1512 and for each user ID 1513. A piece of information indicated by an asterisk (*) in the copy application default setting information 1510 represents "All". For example, the asterisk in the tenant ID 1512 means that the corresponding default values are common among users not logged in to the device. A device ID 1511 stores the value of the device ID identifying the MFP 102 on which the copy application 371 is installed. A job type 1514 stores job type information corresponding to the application. A setting value 1515 and a default value 1516 store the respective setting values and default values of copy jobs.

The copy application default setting information 1510 is transmitted to the device information management server 106 by the copy application 371, and managed in the storage 333. Default setting information according to the applications 372 and 373 is also similarly managed.

Figure 7A:
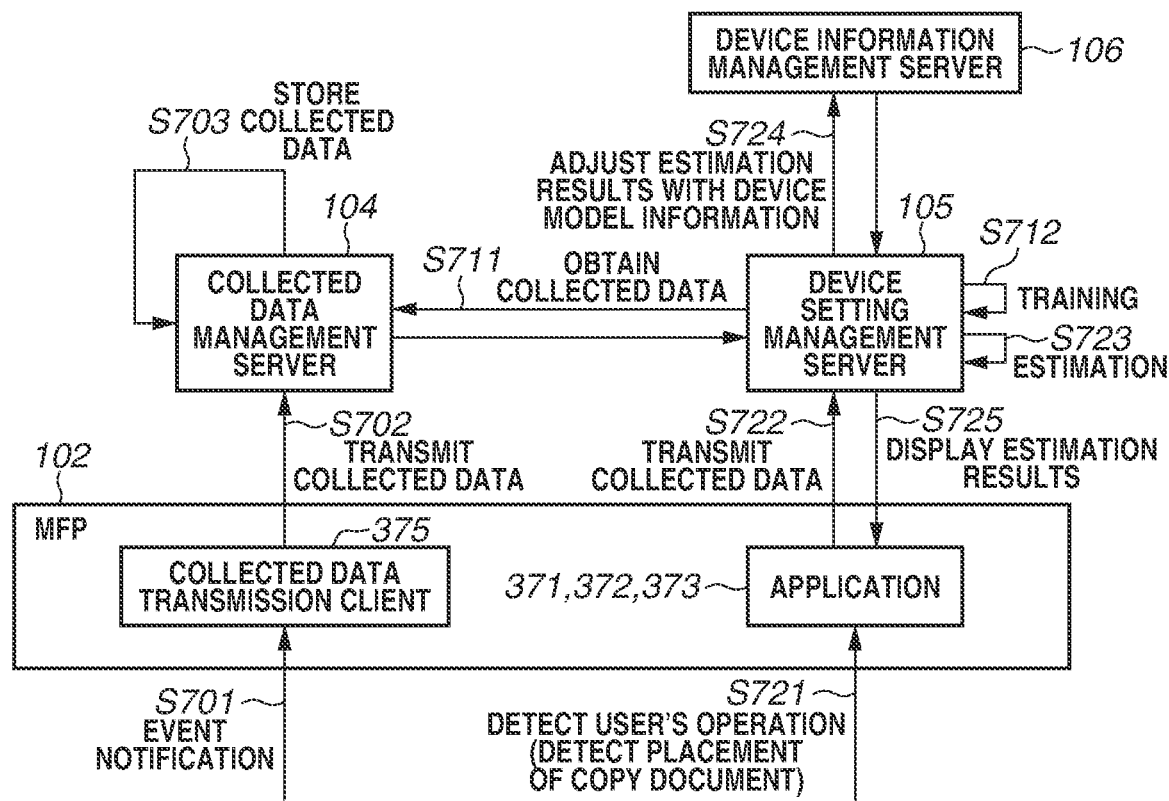
FIG. 7A is a block diagram illustrating data information.
Figure 7B:
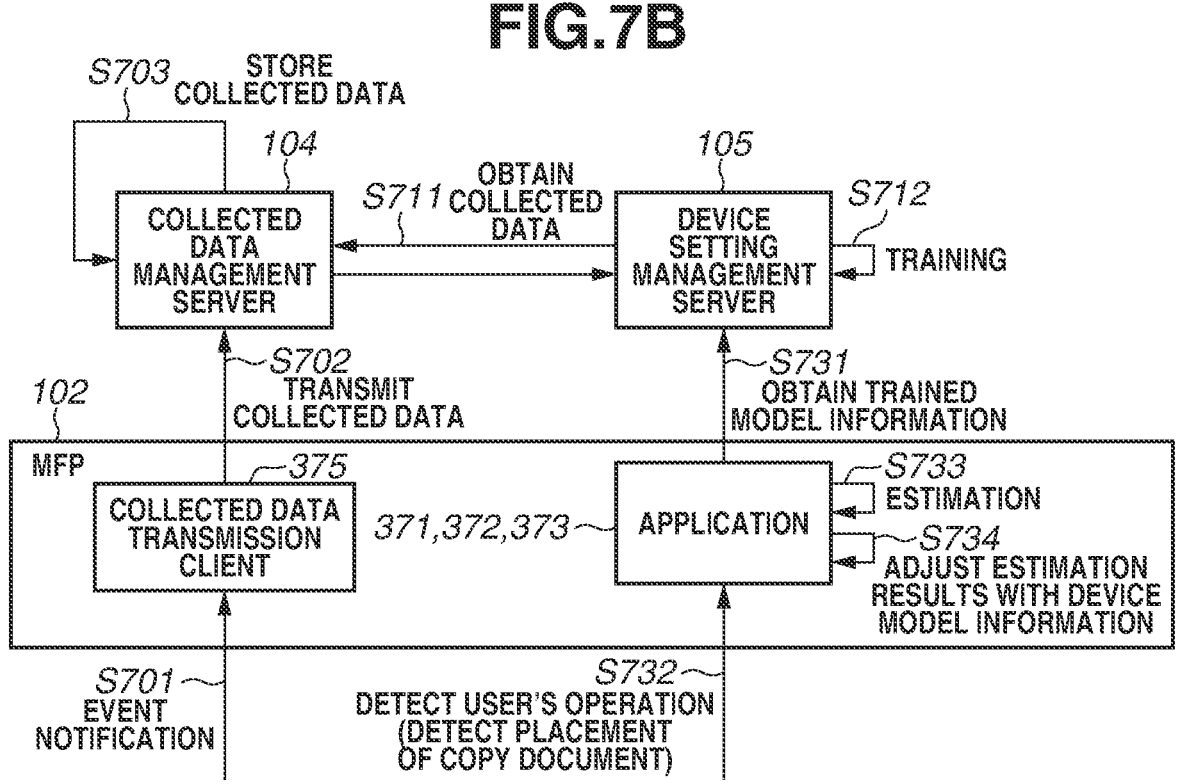
FIG. 7B is a block diagram illustrating data information.

FIGS. 7A and 7B schematically illustrate an outline of processing flows where the setting estimation system according to the first exemplary embodiment performs machine learning on data collected from the MFP 102 and estimates the setting values of the applications 371, 372, and 373 from details of the user's operation by using the trained model information and the model information about the MFP. Details of each processing flow will be described below.

FIG. 7A is a diagram illustrating an outline of processing flows where the device setting management server 105 estimates the setting values of the applications. Steps S701 to S703 are a processing flow representing a series of processes where the collected data management server 104 collects collected data occurring in the MFP 102 via the collected data transmission client 375.

In step S701, the collected data transmission client 375 obtains an event notification occurring in the MFP 102 from the application framework 360. In step S702, the collected data transmission client 375 converts the information included in the event notification obtained in step S701 into the JSON format based on the collected data structure 400, and transmits the conversion result to the collected data management server 104.

In step S703, the collected data management server 104 stores the collected data received from the collected data transmission client 375 as the collected data information 450. Steps S711 and S712 are a processing flow representing a series of processes where the device setting management server 105 generates the trained model information 510, 520, and 530 by machine learning.

In step S711, the device setting management server 105 obtains the collected data information 450 from the collected data management server 104. In step S712, the device setting management server 105 numerically vectorizes the collected data information 450 based on the vectorization information 500, whereby the collected data information 450 is converted into vector representations. The device setting management server 105 then performs machine learning to generate trained models, and stores the trained moles in the storage locations indicated in the trained model file path 614.

Steps S721 to S725 are a processing flow representing a series of processes where the user's device operations are detected, and the device setting management server 105 estimates settings suitable for the applications 371, 372, and 373 from the collected data based on the trained model files and the device model information, and displays the estimated settings on the applications 371, 372, and 373. In FIG. 7A, a description will be given by using a copy operation as an example.

In step S721, the copy application 371 obtains an event notification indicating that a copy document is placed on the MFP 102 from the application framework 360, This event notification includes input.paperSize 506 which is an attribute indicating the paper size of the copy document, input-.colorMode 501 which is an attribute indicating color information about the copy document, and the number of pages (not illustrated).

In step S722, the copy application 371 convers the information included in the event notification obtained in step S721 into the JSON format based on the collected data structure 400, and transmits the conversion result to the device setting management server 105. In step S723, the device setting management server 105 converts the collected data received from the copy application 371 into vector representations based on the vectorization information 500, and estimates values to be set to the copy application 371 by using the trained model information 510 generated in step S712.

In step S724, the device setting management server 105 obtains the device model information about the MFP 102 from the device information management server 106, checks whether the copy settings estimated in step S723 can be implemented on the MFP 102, and adjusts the copy settings. If there is any estimated value unable to be implemented on the MFP 102, the device setting management server 105 changes the estimated value into an implementable setting.

In step S725, the device setting management server 105 transmits the estimated values of the copy settings adjusted in step S724 to the copy application 371. The copy application 371 displays the received estimated values on the operation panel 207.

The processing in steps S701 to S703 where the collected data management server 104 stores the collected data, the processing in steps S711 and S712 where the device setting management server 105 performs machine learning, and the processing in steps S721 to S725 where the device setting management server 105 estimates the settings of the application are asynchronously performed. The processing in steps S711 and S712 where the device setting management server 105 performs machine learning is performed on a regular basis.

FIG. 8 illustrates details of the processing flow where the collected data management server 104 collects the collected data occurring in the MFP 102 via the collected data transmission client 375, outlined in steps S701 to S703 illustrated in FIG. 7.

In step S801, the collected data transmission client 375 receives the event notification occurring in the MFP 102 from the application framework 360. The event notification includes entity, eventName, and attribute information about the event. The event notification is notified at timing when the MFP 102 reads the copy document, for example.

In step S802, the collected data transmission client 375 generates collected data information in the JSON format from the event notification received in step S801. In step S803, the collected data transmission client 375 transmits an authorization token acquisition request to the authorization client 374. At this time, the authorization token acquisition request initially specifies "PutDeviceData" as a scope. The authorization client 374, which has received the authorization token acquisition request, specifies "PutDeviceData" as a client ID, a password, and a scope retained by the authorization client 374, and transmits an authorization token acquisition request to the authorization server 103, and obtains an authorization token.

The authorization client 374 passes the obtained authorization token to the collected data transmission client 375. In step S804, the collected data transmission client 375 transmits the collected data information generated in step S802 and the authorization token obtained in step S803 to the collected data management server 104.

In step S805, the collected data management server 104 obtains the collected data information and the authorization token transmitted from the collected data transmission client 375. In step S806, the collected data management server 104 specifies PutDeviceData as the authorization token and the scope Obtained in step S805, and transmits an authorization token validation request to the authorization server 103.

When receiving the authorization token validation request, the authorization server 103 refers to the authorization token information table and initially checks whether there is an authorization token information record that matches the combination of the authorization token and the scope received from the collected data management server 104. If a matching record is found, the authorization server 103 validates the value of the expiration date column.

If the validation is successful, the authorization server 103 obtains a client information record including the same value as that of the client ID column of the authorization token information record from the client information table, and transmits the value of the tenant ID column of the obtained record to the collected data management server 104. In step S807, the collected data management server 104 adds the value of the tenant ID received from the authorization server 103 in step S806 to the collected data received in step S801. In step S808, the collected data management server 104 stores the collected data to which the value of the tenant ID has been added in step S807 as the collected data information 450.

FIG. 9 illustrates details of the processing flow where the device setting management server 105 performs machine learning, outlined in steps S711 and S712 illustrated in FIG. 7. In step S901, the device setting management server 105 obtains the collected data information 450 from the collected data management server 104. Of the pieces of obtained collected data information, the device setting management server 105 uses, for the machine learning, three types of collected data where entity=job, eventName jobCompleted, and jobType=copy, scan, or print.

The collected data where the value of jobType is copy refers to data generated when the user executes a function of the copy application 371 on the MFP 102. The collected data where the value of jobType is scan refers to data generated when the user executes a function of the scan application 372 on the MFP 102. The collected data where the value of jobType is print refers to data generated when the user executes a function of the print application 373 on the MFP 102.

In step S902, the device setting management server 105 classifies the collected data obtained in step S901 into "All" data, tenant ID-specific data, and user ID-specific data with respect to each value of jobType, and uses the respective pieces of data as training data. The processing in step S902 and the subsequent steps is performed on all the training data, i.e., the training data on the "All" data, the tenant ID-specific training data, and the user ID-specific training data classified with respect to each of the values of the three types of jobType's.

In step S903, the device setting management server 105 classifies the pieces of training data prepared in step S902 into input data and correct answer data. Tables 5 to 7 are data tables illustrating input data and correct answer data classified with respect to each value of jobType.

Table 5 is a data table illustrating the result of classification of the collected data where the value of jobType is copy into input data and correct answer data.

TABLE 5

Training Data Table for copy (Device Setting Management Server 105)

| Input data | Correct answer data |
| --- | --- |
| input.paperSize<br>input.pageNumber | printSettings.colorMode<br>printSettings.copies<br>printSettings.layout<br>printSettings.paperSide<br>output.paperSize |

In the present exemplary embodiment, the input data includes the paper size and the number of sheets of a copy document that are event individual attributes of the copy job. However, this is not intended to limit the input data. Attribute values of scan images of the document scanned for the purpose of copying and feature amounts obtainable by the scan images can also be used as input data. The values of time information (e.g., the time of execution of the copy), user information (e.g., a department, position, and age), information about the MFP 102 (e.g., a model, installation location, and copy speed), and other information that are common attribute values of the event may also be used as input data. The correct answer data can also specify information other than the copy setting items described in the first exemplary embodiment. Using setting items of the functions of the MFP 102 as correct answer data is also applicable to any setting items.

Table 6 is an example of a data table illustrating the result of classification of the collected data where the value of jobType is scan into input data and correct answer data.

TABLE 6

Training Data Table for scan (Device Setting Management Server 105)

| Input data | Correct answer data |
| --- | --- |
| input.paperSize<br>input.readType<br>input.pageNumber | scanSettings.colorMode<br>scanSettings.dpi<br>scanSettings.paperSide<br>output.destination<br>output.fileType |

Table 7 is an example of a data table illustrating the result of classification of the collected data where the value of jobType is print into input data and correct answer data.

TABLE 7

Training Data Table for print (Device Setting Management Server 105)

| Input data | Correct answer data |
| --- | --- |
| input.fileType<br>printSettings.copies | printSettings.colorMode<br>printSettings.layout<br>printSettings.paperSide |

In step S904, the device setting management server 105 numerically vectorizes both the input data and the correct answer data generated in step S903 based on the vectorization information 500, whereby the input data and the correct answer data are converted into input vectors and correct answer vectors, respectively. In step S906, the device setting management server 105 applies training processing to all the correct answer vectors converted in step S904, one vector at a time. If the training processing on all the correct answer vectors is completed, the series of processes illustrated in the processing flow ends.

While in the first exemplary embodiment the correct answer vectors are processed one by one, a plurality of correct answer vectors may be collectively subjected to training. If training is performed by using a plurality of correct answer vectors, a large amount of data is needed to make accurate estimates because of an increased vector space. Since tenant-by-tenant or use-by-user training data is difficult to collect in volume and ends up being small in amount, the training in a wide vector space may thereby reduce the estimation accuracy. In the present exemplary embodiment, the correct answer vectors are processed one setting item at a time. This can increase the estimation accuracy even with a small amount of training data, since the training is performed in a minimum vector space.

In step S906, the device setting management server 105 performs training by using a Support Vector Machine (SVM) with the input vectors and one setting item of correct answer vector converted in step S904 so that the correct answer vector can be obtained from the input vectors. The SVM is a known machine learning algorithm. In the present exemplary embodiment, a Radial Basis Function (RBF) Kernel based nonlinear soft margin SVM is used. In the training, the training result is evaluated by cross-validation where the training data is divided into analysis data and validation data at random. The hyperparameters of the RBF-based SVM include a cost parameter (C) and gamma ($\gamma$), which affect the estimation performance. A grid search of trying out a respective plurality of values in a comprehensive manner is therefore performed, and ones providing high estimation performance are selected as the training result. SVMs are capable of both classification learning and regression learning. Regression is used for setting items that need a numerical estimation, such as printSettings.copies indicating the number of copies to be printed by copying, among the setting items to be estimated. Classification is used for colorMode, layout, paperSide, and paperSize.

There are various machine learning algorithms, such as a perceptron, logistic regression, a neural network, the k-nearest neighbors algorithm, naive Bayes, a convolutional neural network, a decision tree, a random forest, linear regression, polynomial regression, Lasso regression, and ridge regression. There are also different types of SVMs, such as a hard margin SVM and a polynomial kernel SVM. The hyperparameters of the machine learning algorithms also vary from one machine learning algorithm to another. Beside the cross-validation, techniques for evaluating a training result include an alternative estimation method, and a test sample method. Moreover, techniques for optimizing the hyperparameters of the machine learning algorithm aside from a grid search include a random search, Latin hypercube sampling, and Bayesian optimization. In the present exemplary embodiment, the training techniques including the machine learning algorithm, the technique for evaluating the training result, and the technique for optimizing the hyperparameters of the machine learning algorithm may be changed.

In step S907, the device setting management server 105 stores the trained model trained in step S906 into a file, and registers the trained model in the trained model information 510, 520, or 530 corresponding to the value of jobType. The file in which the trained model is stored includes the type of the learning algorithm (RBF-based nonlinear soft margin SVM), the values of the hyperparameters of the learning algorithm (cost parameter (C) and gamma ($\gamma$)), and a coefficient vector obtained as a result of the training.

In the case of the tenant ID-specific training data classified in step S902, the file is registered in the trained model information 510, 520, or 530 by specifying the tenant ID of the training data in the tenant ID 511, 521, or 531 with an asterisk (*) in the user ID 512, 522, or 532. In the ease of the user ID-specific training data classified in step S902, the file is registered by specifying the tenant ID of the training data in the tenant ID 511, 521, or 531 with the user ID of the training data in the tenant ID 512, 522, or 532.

In the case of the training data on the All data classified in step S902, the file is registered with an asterisk (*) in both the tenant ID 511, 521, or 531 and the user ID 512, 522, or 532. The item name of an item processed in step S905 (e.g., copies, colorMode, layout, paperSide, and paperSize) is attached as a trained model filename.

Figure 10A:
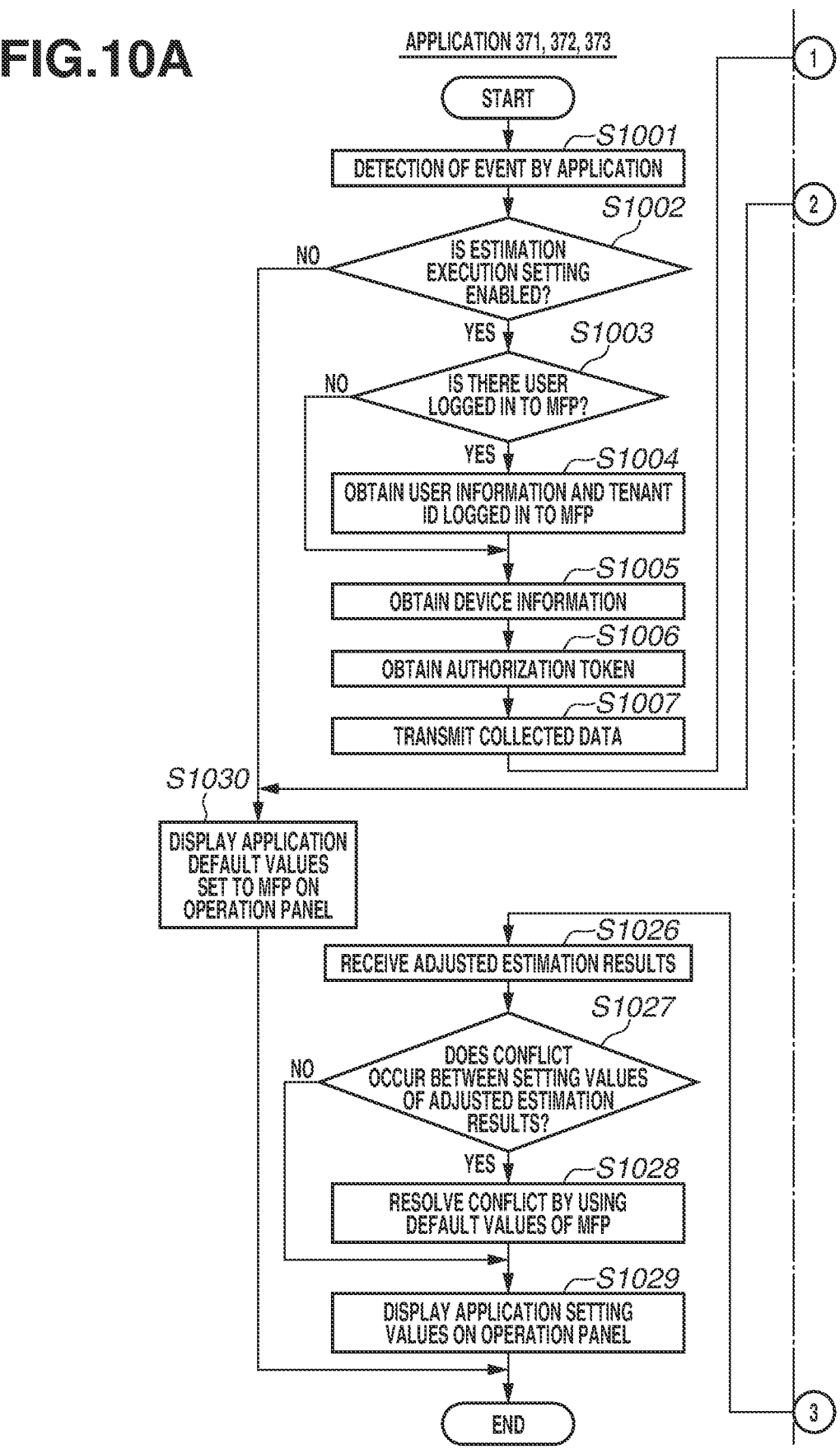

FIGS. 10A and 10B illustrate details of the processing flow where the device setting management server 105 detects the user's device operation and estimates settings suitable for the operation, outlined in steps S721 to S725 illustrated in FIG. 7A. The processing flow will be described below on the assumption that the user operation is to execute a copy.

In step S1001, the copy application 371 receives an event notification corresponding to the reading of a copy document by the MFP 102 from the application framework 360. The event notification here includes information, such as the paper size of the copy document (input.paperSize) and the number of pages of the copy document to be read (input.pageNumber).

FIGS. 11A and 11B illustrate an application screen serving as a user interface of the copy application 371 displayed on the operation panel 207. FIG. 11A is a diagram illustrating the application screen immediately after the copy application 371 receives the event notification corresponding to the reading of a copy document by the MFP 102 from the application framework 360 in step S1001.

A copy application screen 1100 includes an application message display section 1101, a document information display section 1102, a copy setting information display section 1103, and an estimation setting checkbox 1104. The application message display section 1101 is an area for notifying the user of a message indicating the current state of the copy application 371. For example, if the copy paper loaded in the MFP 102 has run out or the toner has run out and the copy is unable to be executed, that state is notified via the application message display section 1101.

The document information display section 1102 is an area for displaying information about the copy document read by the copy application 371, and displays information included in the event notification received in step S1001. The copy setting information display section 1103 is an area for displaying various setting items and their values when the copy application 371 executes a copy. When a copy document is read, the copy setting information display section 1103 usually displays initial values set in the copy application 371. Aside from the values set in the copy application 371, initial values corresponding to the tenant ID of a tenant to which the MFP 102 belongs and the user ID of an user logged in to the MFP 102 may be displayed.

The estimation setting checkbox 1104 is a checkbox for determining whether the copy application 371 performs the copy setting estimation processing illustrated in steps S721 to S725. The copy application 371 retains the information about whether the checkbox 1104 is enabled or disabled. In the first exemplary embodiment, a copy is assumed to be executed by the user pressing a copy instruction button not illustrated in FIGS. 11A and 11B. However, a copy may be started after a certain time without the button being pressed.

If the checkbox 1104 is enabled, then in step S1002, the copy application 371 determines that the copy settings need to be estimated, and the processing proceeds to step S1003. If the checkbox 1104 is disabled, then in step S1002, the copy application 371 determines that the copy settings do not need to be estimated, and the processing proceeds to step S1030.

In step S1003, the copy application 371 inquires the device authentication application 370 whether there is a user logged in to the MFP 102. If there is a user logged in to the MFP 102, then in step S1004, the copy application 371 obtains the logged-in user ID and the tenant ID from the device authentication application 370. If there is no user logged in to the MFP, the processing proceeds to step S1005. In step S1005, the copy application 371 obtains a device ID and a model type as device information to be stored in the storage device 208 of the MFP 102.

Table 8 is a data table illustrating the device information managed by the storage device 208 of the MFP 102.

TABLE 8

Device Information Management Table (MFP 102)

| Device ID | Model type | ... |
|---|---|---|
| Device 0001 | Type A | ... |

The device ID column stores the device ID that is an identifier uniquely assigned to the MFP 102 described above. The model type column stores the model type of the MFP 102. The model type is information for referring to information about, for example, the device capabilities of the MFP 102, and the installed applications. This means that MFPs having different device IDs and the same model type have the same capabilities. The device information is managed by the device information management server 106.

In step S1006, the copy application 371 issues an authorization token acquisition request to the authorization client 374 with PutDeviceData specified as a scope, and receives an authorization token. Since the authorization token acquisition request is similar to that of step S803, a description thereof will be omitted.

In step S1007, the copy application 371 transmits collected data to the device setting management server 105 and requests the device setting management server 105 to estimate copy settings. The collected data transmitted by the copy application 371 here includes the copy document size (input.paperSize) and the number of pages of the copy document (input.pageNumber) received in step S1001, the user ID and the tenant ID obtained in step S1004, and the authorization token obtained in step S1006.

In step S1008, the device setting management server 105 receives the collected data transmitted from the copy application 371 in step S1007. In step S1009, the device setting management server 105 specifies PutDeviceData as the authorization token and the scope included in the collected data received in step S1008, and transmits an authorization token validation request to the authorization server 103. Since the authorization token validation request is similar to that of step S806, a description thereof will be omitted. If the validation of the authorization token is successful, the processing proceeds to step S1010. If the validation fails, the processing proceeds to step S1030.

In step S1010, the device setting management server 105 vectorizes the event information, the copy document size (input.paperSize), and the number of pages of the copy document (input.pageNumber) included in the collected data received in step S1008 based on the vectorization information 500. In steps S012 to S1018, the device setting management server 105 performs estimation processing on all the copy setting items (colorMode, copies, layout, paperSide, and paperSize) of the copy application 371. If the device setting management server 105 has completed the estimation processing on all the copy setting items, the processing proceeds to step S1019.

In step S1012, the device setting management server 105 checks whether the collected data received in step S1008 includes either one or both of a user ID and a tenant ID. If neither of a user ID and a tenant ID is included in the collected data, the processing proceeds to step S1017.

In step S1013, the device setting management server 105 refers to the user ID 512 of the trained model information 510 corresponding to the copy application 371, and checks whether there is a trained model matching the user ID obtained in step S1012. If there is such a trained model, the processing proceeds to step S1014. In step S1013, if there is no trained model matching the user ID obtained in step S1012, the processing proceeds to step S1015.

In step S1014, the device setting management server 105 reads a trained model file stored in the storage destination indicated in the trained model file path 514 of the record including the user ID checked in step S1013, and performs processing for estimating a copy setting. Here, the copy document size (input.paperSize) and the number of pages of the copy document (input.pageNumber) vectorized in step S1010 are used as the inputs to the trained model. The output of the trained model is regarded as an estimated vector. If the setting item to be estimated is a numerical value (printSettings.copies), an integer obtained by rounding off the estimated vector is regarded as an estimated value. If the setting item to be estimated is a classification, the obtained estimated vector is converted based on the vectorization information 500, and the result is regarded as an estimated value.

In step S1015, the device setting management server 105 refers to the tenant ID 511 and the user ID 512 of the trained model information 510 corresponding to the copy application 371, and checks whether there is a record that matches the tenant ID obtained in step S1012 and in which the value of the user ID 512 is an asterisk (*). If there is such a record, the processing proceeds to step S1016. In step S1015, if there is no record matching the tenant ID obtained in step S1012, the processing proceeds to step S1017.

In step S1016, the device setting management server 105 performs estimation processing for the case where there is no user logged in to the MFP 102 in step S1003 or where the device setting management server 105 retains no user ID-specific trained model. The device setting management server 105 reads a trained model file stored in the tenant ID-specific trained model file path 514 in step S1015, and estimates a copy setting. The inputs and output of the trained model and the conversion of the estimated vector into a setting are similar to those in step S1014, and a description thereof will thus be omitted.

In step S1017, the device setting management server 105 checks the trained model information 510 for a record where the values of both the tenant ID 511 and the user ID 512 are an asterisk (*). If there is such a record, the processing proceeds to step S1018. In step S1018, the device setting management server 105 reads a common trained model file not dependent on the tenant ID or the user ID, stored in the storage destination indicated in the trained model file path 514 obtained in step S1017, and estimates a copy setting. Since the inputs and output of the trained model and the conversion of the estimated vector into a setting value are similar to those in step S1014, a description thereof will be omitted.

In step S1019, the device setting management server 105 obtains the device information about the MFP 102 from the collected data obtained in step S1008. The device setting management server 105 then obtains the model type of the MFP 102 from the device information, and obtains device model information about an MFP matching the obtained device type from the device information management server 106. For example, since the model type of the MFP 102 here is Type A, the device setting management server 105 obtains all records where the model type is Type A from the device information management table managed by the device information management server 106.

In step S1020, the device setting management server 105 compares all the copy setting items of the copy application 371 estimated in steps S1011 to S1018 with the device model information about the MFP 102 obtained in step S1019, and determines whether the estimation results are implementable on the MFP 102.

If the user frequently uses an MFP that is used for the input data for generating the trained models, the estimation results obtained from the user's operation and the trained models based thereon are implementable on the MFP used by the user. In contrast, if the user uses an MFP for the first time and the MFP has not been frequently used for the input data for generating the trained models, the intact estimation results are not always necessarily applicable to the MFP. The processing in step S1020 performed by the device setting management server 105 is to bridge the gap between such estimation results and the capabilities of the MFP to reflect the estimation results.

In step S1021, the device setting management server 105 determines whether the setting values of the estimation results are ones settable on the MFP 102. A specific description will be given. The device setting management server 105 converts the estimated vectors obtained as a result of the estimation processing executed in steps S1011 to S1018 based on the vectorization information 500. The device setting management server 105 then checks whether each of the converted estimated values of the copy settings falls within the setting item values of the corresponding device model information.

For example, if the model type of the MFP 102 is "Type A", the setting item "input.dpi" can take a value of 100 to 500 as its item value. If the estimation result of the setting item "input.dpi" has a value falling within the range, the device setting management server 105 determines that the item value of the estimation result is settable on the MFP 102, and checks the next estimation result. In step S1021, if the estimation result does not fall within the item values of the setting item, the device setting management server 105 determines that the intact estimation result is unable to be set on the MFP 102, and the processing proceeds to step S1022.

In step S1022, the device setting management server 105 checks for an item value alternative to the estimation result based on the device model information obtained in step S1019. For example, if the model type of the MFP 102 is "Type A" and the estimated value of the setting item "input.dpi" is "600" the device setting management server 105 proceeds to step S1023 since there is a value alternative to the estimation result of the setting item "input.dpi".

In step S1023, the device setting management server 105 determines which value to use as the alternative value of the estimation result among the values alternative to the estimation result, obtained in step S1022. The device setting management server 105 initially refers to the alternative rule information 1410, and obtains a record where the setting value 1414 matches the setting value determined to be yet to be adjusted in step S1020 from among the records where the tenant ID 1411 and the user ID 1412 match the tenant ID and the user ID obtained in step S1012. In step S1022, the device setting management server 105 then determines an alternative value from a list of values alternative to the estimation result based on the alternative rule 1415 of the record.

For example, if the alternative rule 1415 for the setting value "input.dpi" is "Descending", the device setting management server 105 selects "500", which is the value closest to the estimated value "600" in descending order from the maximum value "500", among the values that the MFP 102 of the model type "Type A" can take as the alternative value of the setting item "input.dpi".

If the MFP 102 does not have the estimated item itself, the processing proceeds to step S1024 since no alternative value can be determined. The device setting management server 105 discards the estimated value of the setting item determined in one of steps S1014, S1016, and S1018. In step S1031, the device setting management server 105 obtains the default value of the setting item of which the estimated value is deleted in step S1024 from the copy application default setting information 1510 managed by the device information management server 106.

For example, if the MIR 102 of which "color" is estimated as the estimated value of the setting item "output.colorMode" is of a model type not capable of color output but only capable of "mono" setting, the estimated value is supposed to be adjusted in step S1022 based on the alternative rule information 1410. Here, if the user operating the copy application 371 is one whose tenant ID is "tenant0001" and user ID is "user1111" the alternative rule 1415 is also "color", i.e., both the estimated value and the value based on the alternative rule indicate a value not usable by the MFP 102. In such a case, in step S1031, the device setting management server 105 obtains "mono", which is the default value settable to the MFP 102 from the copy application default setting information 1510, and substitutes the default value for the estimated value.

In step S1025, the device setting management server 105 transmits the estimation results of the copy setting adjusted in step S1020 to the copy application 371. In step S1026, the copy application 371 receives the copy settings estimated by the device setting management server 105. In step S1027, the copy application 371 checks whether a conflict occurs between the setting values when the setting values of the estimated values of the copy settings received are applied to the copy application 371. If an inconsistency or conflict is found, the processing proceeds to step S1028.

For example, if the estimated value of the color reading setting (input.coloMode) that the copy application 371 receives from the device setting management server 105 is mono and the estimated value of the color output setting (output.colorMode) is color, a monochrome copy product is output as a result of execution of the copy function. In such a case, in step S1028, the copy application 371 resolves the conflict or inconsistency between the estimated values based on the default copy settings retained by the copy application 371.

If the default color reading setting of the copy application 371 is color, the copy application 371 corrects the value of the color reading setting (input.colorMode) to color. If the default color reading setting of the copy application 371 is mono, the copy application 371 changes the estimated value of the color output setting (output.colorMode) to mono.

While the conflict is described to be resolved by using the default values, the conflict may be resolved by using other values instead of using the default values.

In step S1029, the copy application 371 displays the estimation results obtained from the device setting management server 105 and adjusted, on the copy application screen 1100. FIG. 11B is a diagram illustrating a result of display of the estimation results that the copy application 371 of the MFP 102 serving as the destination for which the setting values are provided has obtained from the device setting management server 105 and adjusted on the copy application screen 1100 in step S1029.

An application message display section 1111 displays an additional message indicating that the copy settings have been made based on the copy setting estimation processing of the device setting management server 105. This enables the user to recognize that the displayed setting values are ones obtained as a result of estimation. A document information display section 1112 is an area for displaying the information about the copy document read by the copy application 371. The document information display section 1112 displays information included in the event notification received in step S1001.

A copy setting information display section 1113 is an area for displaying the estimated values of the copy settings finally adjusted by the copy application 371 in step S1028. The manner of display of the setting values determined by the estimation processing and that of the setting values on which the default values of the copy application 371 are reflected to the user may be distinguished by highlighting and the like. An estimation setting checkbox 1114 is a checkbox for determining whether the copy application 371 performs the copy setting estimation processing described in steps S721 to S725. The estimation setting checkbox 1114 is in an enabled state if the estimation processing is to be performed.

If the execution of the estimation processing is not enabled in step S1002 or if the estimation processing is not executed, then in step S1030, the copy application 371 displays the default values based on the copy application default setting information 1510 on the copy setting information display section 1113 of the operation panel 207.

Which trained models to use in estimating the settings in the series of estimation processes, the user ID-specific trained models, the tenant ID-specific trained models, or the trained models with asterisks (*) in the tenant ID 711 and the user ID, may be switched based on a setting. Whether to estimate the settings by using trained models or use the setting default values may also be switched based on a setting, As described above, the event information occurring in the MFP 102 is stored in the collected data management server 104, and the device setting management server 105 uses the results of learning of the collected data as trained models, whereby the application settings of the applications 371, 372, and 373 can be estimated. In addition, the estimation results are compared with the capabilities of the model of the MFP operated by the user to determine whether the settings can be reflected. If an inconsistency or conflict occurs between the application settings, the application settings are adjusted by using the default values of the application. This can increase the reliability of the estimation results.

The training data items of an MFP inevitably overlap between the functions for the user to use. For example, both the scan function and the copy function include reading a document, and similar data is thus obtained. To address such an issue, training is performed with respect to each job that the MFP performs, whereby the estimation results can be derived in a form more appropriate to the functions for the user to use.

Second Exemplary Embodiment

The trained models that are the results of learning of the event information occurring in the MFP 102 by the device setting management server 105 can also be used by other than the servers on the Internet. A second exemplary embodiment describes a series of processes where an MFP 102 estimates the application settings of applications 371, 372, and 373 on the MFP 102 by using trained models.

Figure 13B:
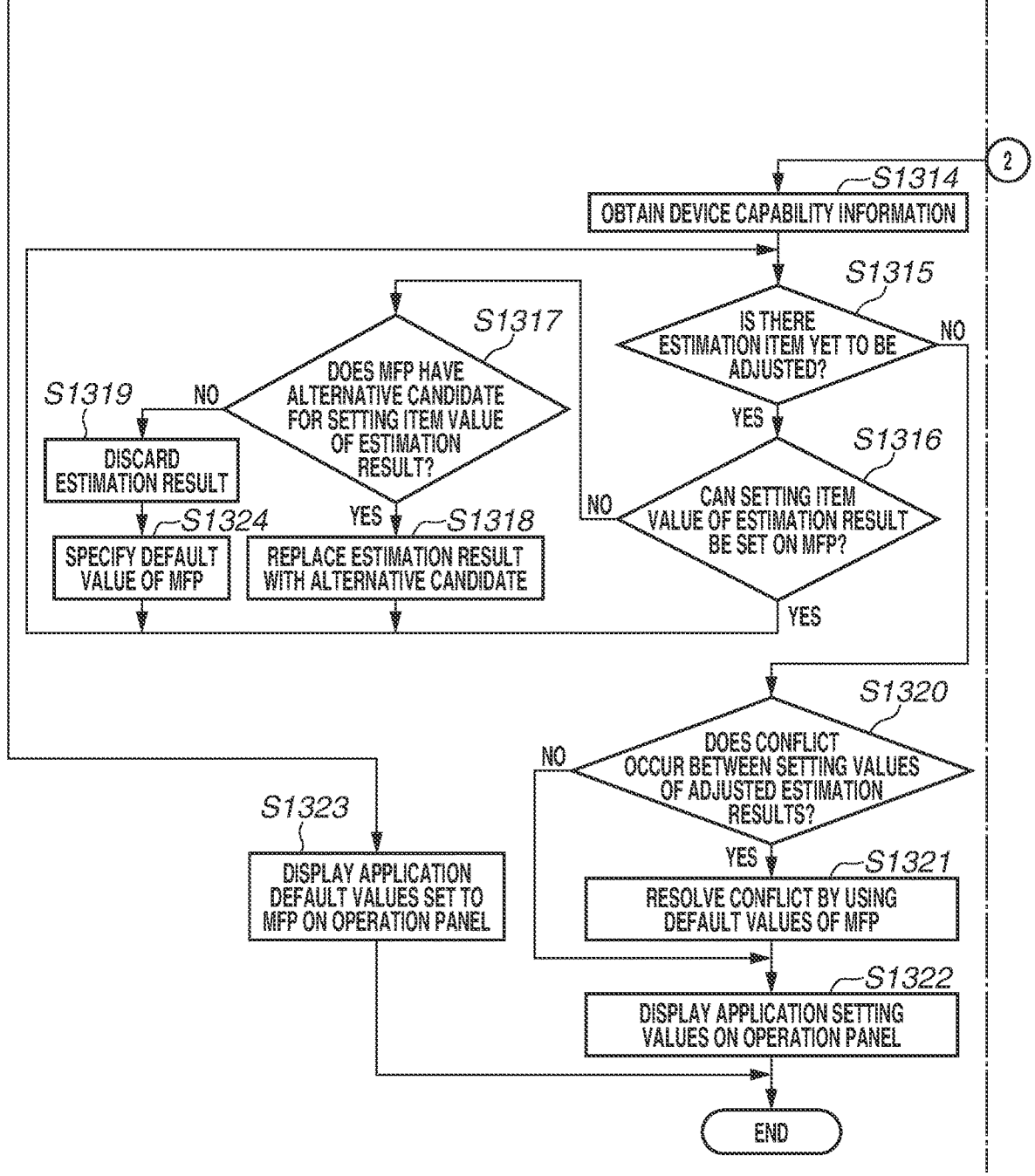

In the first exemplary embodiment, the processing for estimating the settings of the applications 371, 372, and 373 by the device setting management server 105 has been described in detail with reference to FIGS. 8 to 11B. In FIGS. 12, 13A and 13B, a case will be described in detail where the applications 371, 372, and 373 obtain trained model files from a device setting management server 105 and perform the processing for estimating the application settings by themselves in steps S731 to S734 illustrated in FIG. 78.

FIG. 78 is a diagram illustrating an outline of the processing flow where the applications 371, 372, and 373 of the MFP 102 estimate the application settings. Since the processing flows of steps S701 to S703 and steps S711 and S712 are similar to those illustrated in FIG. 7A, a description thereof will be omitted.

The processing flow of steps S731 to S734 illustrates a series of processes where the MFP 102 detecting a user's device operation estimates settings suitable for the applications 371, 372, and 373 based on the trained model files and device model information, and displays the settings on the applications 371, 372, and 373. In FIG. 78, a description will be given by using a copy operation as an example.

In step S731, the applications 371, 372, and 373 obtain vectorization information 500 and trained model information 510, 520, and 530 from the device setting management server 105, and store the vectorization information 500 and the trained model information 510, 520, and 530. In step S732, the copy application 371 obtains an event notification indicating that a copy document is placed on the MFP 102 from an application framework 360. The event notification includes input.paperSize 506, which is an attribute indicating the paper size of the copy document, input.colorMode 501, which is an attribute indicating color information about the copy document, and the number of pages (not illustrated).

In step S733, the copy application 371 converts the attribute information included in the event notification into vector representations based on the vectorization information 500, and estimates the values to be set to the copy application 371 based on the trained model information 510 stored in step S731. In step S734, the copy application 371 obtains the device model information about the MFP 102, checks whether the estimated values of the copy settings derived in step S733 can be implemented on the MFP 102, and adjusts the estimated values. If there is an estimate value unable to be implemented on the MFP 102, the copy application 371 changes the estimated value to an implementable setting. The copy application 371 then displays the estimated and adjusted values on an operation panel 207.

FIG. 12 illustrates details of the processing flow where the copy application 371 obtains the vectorization information 500, the trained model files, and alternative rule information 1410, 1420, and 1430 from the device setting management server 105 in step S731 of FIG. 7B. Note that the copy application 371 performs the series of processes illustrated in FIG. 12 on a regular basis to Obtain the latest vectorization information, trained model files, and alternative rule information.

In step S1201, the copy application 371 obtains a tenant ID from an authorization client 374. The authorization client 374 passes the value of the tenant ID column of the client information table illustrated in Table 4 to the copy application 371.

In step S1202, the copy application 371 issues an authorization token acquisition request to the authorization client 374 with GetDeviceSetting specified as a scope, and receives an authorization token. Since the authorization token acquisition request has been described above in step S803, a description thereof will be omitted.

In step S1203, the copy application 371 obtains the trained model information and the trained model files from the device setting management server 105. Here, the copy application 371 specifies the trained models by specifying the authorization token received in step S1202 and the tenant ID obtained in step S1201. The device setting management server 105 requests the authorization server 103 to check the authorization token received from the copy application 371, and passes the trained model information 510 and the trained model files matching the specified tenant ID to the copy application 371.

In step S1204, the copy application 371 stores the trained model information 610 and the trained model files obtained in step S1203. In step S1205, the copy application 371 obtains the vectorization information 500 from the device setting management server 105 by using the authorization token received in step S1202 as a parameter.

The device setting management server 105 requests the authorization server 103 to check the received authorization token, and passes the vectorization information 500 to the copy application 371. In step S1206, the copy application 371 stores the vectorization information obtained in step S1205.

In step S1207, the copy application 371 obtains the alternative rule information 1410 from the device setting management server 105 by using the authorization token received in step S1202 as a parameter. In step S1208, the copy application 371 stores the alternative rule information obtained in step S1207.

FIGS. 13A and 13B illustrate details of the processing flow where the copy application 371 performs the copy setting estimation processing in steps S732 to S734 illustrated in FIG. 7B. The processing of steps S1301 and S1302 is similar to that of steps S1001 and S1002, and a description thereof will thus be omitted.

In step S1303, the copy application 371 vectorizes the copy document size (input.paperSize) and the number of pages of the copy document (input.pageNumber) received in step S1301 based on the vectorization information 500. In steps S1305 to S1313, the copy application 371 performs the estimation processing on all the copy setting items (color-Mode, copies, layout, paperSide, and paperSize) of the copy application 371.

If the copy application 371 has completed the estimation processing on all the copy setting items, the processing proceeds to step S1314. In step S1305, the copy application 371 inquires the device authentication application 370 whether there is a user logged in to the MFP 102. If there is a user logged in to the MFP 102, then in step S1306, the copy application 371 obtains the user ID of the logged-in user from the device authentication application 370. If there is no user logged in to the MFP, the processing proceeds to step S1309.

In step S1307, the copy application 371 refers to the user ID 612 of the trained model information 610 corresponding to the copy application 371, and checks whether there is a trained model matching the user ID obtained in step S1306. If there is such a trained model, the processing proceeds to step S1308. In step S1307, if there is no trained model matching the user ID obtained in step S1306, the processing proceeds to step S1309.

In step S1308, the copy application 371 reads a trained model file stored in the trained model file path 614 of the record including the user ID checked in step S1307, and performs the copy setting estimation processing. Here, the copy document size (input.paperSize) and the number of pages of the copy document (input.pageNumber) vectorized in step S1303 are used as the inputs to the trained model. The output of the trained model is regarded as an estimated vector. If the setting item to be estimated is a numerical value (printSettings.copies), an integer obtained by rounding off the estimated vector is regarded as an estimated value. If the setting item to be estimated is a classification, the obtained estimated vector is converted based on the vectorization information 500, and the result is regarded as an estimated value.

If there is no user logged in to the MFP 102 in step S1305 or if there is no user ID-specific trained model retained, then in step S1309, the copy application 371 obtains a tenant ID from the authorization client 374. The authorization client 374 passes the value of the tenant ID column of the client information table illustrated in Table 4 to the copy application 371.

In step S1310, the copy application 371 refers to the tenant ID 611 and the user ID 612 of the trained model information 610 corresponding to the copy application 371, The copy application 371 then checks for a record that matches the tenant ID obtained in step S1309 and in which the value of the user ID 612 is an asterisk (*). If there is such a record, the processing proceeds to step S1311. In step S1310, if there is no trained model matching the tenant ID obtained in step S1309, the processing proceeds to step S1312.

If there is no user logged in to the MFP 102 in step S1305 or if no user ID-specific trained model retained, then in step S1311, the copy application 371 reads a trained model file stored in the tenant ID-specific trained model file path 614, and estimates the copy setting. Since the inputs and output of the trained model and the conversion of the estimated vector into the setting value are similar to those in step S1308, a description thereof will be omitted.

In step S1312, the copy application 371 checks the trained model information 610 for a record where the values of both the tenant ID 611 and the user ID 612 are an asterisk (*). If there is such a record, the processing proceeds to step S1313. In step S1313, the copy application 371 reads a common trained model file not depending on the tenant ID or the user ID, stored in the trained model file path 614 obtained in step S1312, and estimates the copy setting. Since the inputs and outputs of the trained model and the conversion of the estimated vector into the estimated value are similar to those in step S1308, a description thereof will be omitted. In step S1314, the copy application 371 obtains the device information stored in the storage device 208 of the MFP 102.

In step S1315, the copy application 371 compares the copy settings of the copy application 371 estimated in steps S1304 to S1313 with the device model information about the MFP 102 obtained in step S1314. The copy application 371 then determines whether the estimation results can be implemented on the MFP 102. The comparison processing from this step S1315 to step S1318 is similar to the processing of steps S1020 to S1024, and a description thereof will thus be omitted.

In step S1319, the copy application 371 determines that the estimated value is unable to be replaced with an alternative value, and deletes the estimated value of the setting item determined in step S1308, S1311, or S1313. In step S1324, the copy application 371 obtains the default value of the setting item of which the estimated value is deleted in step S1319 from the copy application default setting information 1510 managed by the MFP 102, and substitutes the default value for the estimated value.

In step S1320, the copy application 371 checks whether an inconsistency or conflict occurs between the copy settings when the items of the estimated values of the copy settings are applied to the copy application 371. If an inconsistency or conflict is found, the processing proceeds to step S1321. In step S1321, the copy application 371 resolves the conflict or inconsistency between the estimated values based on the retained default copy settings. Since this processing is similar to that of step S1027, a description thereof will be omitted.

In step S1322, the copy application 371 displays the estimation results on the copy application screen 1100. If the execution of the estimation processing is not enabled in step S1302 or if the estimation processing is not executed, then in step S1323, the copy application 371 displays the default values on the copy setting information display section 1113 of the operation panel 207.

As described above, the event information occurring in the MFP 102 is stored in the collected data management server 104, and the MFP 102 uses the learning results of the collected data as trained models. The application settings of the applications 371, 372, and 373 can thereby be estimated. In addition, the estimation results are compared with the capabilities of the model of the MFP operated by the user to check whether the settings can be reflected. If an inconsistency or conflict occurs between the application settings, the estimation results can be adjusted by using the default values of the application. This can increase the reliability of the estimation results.

The training data items of an MFP inevitably overlap between the functions for the user to use. For example, both the scan function and the copy function include reading a document, and similar data is thus obtained. To address such an issue, training is performed with respect to each job type that the MFP performs, whereby the estimation results can be derived in a form more appropriate to the functions for the user to use.

While the exemplary embodiments have been described by using an MFP as an example, other devices may be used. While the foregoing description has been given by using the copy function of the MFP as an example, device processing by other functions may also be performed.

The present invention is also implemented by performing the following processing. Specifically, the processing includes supplying software (program) for implementing the functions of the foregoing exemplary embodiments to a system or an apparatus via a network or various storage media, and reading and executing the program by a computer (or CPU, MPU, or the like) of the system or the apparatus.

The present invention is not limited to the foregoing exemplary embodiments, and various changes and modifications can be made without departing from the spirit and scope of the present invention. The following claims are thus attached to make the scope of the present invention public.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A system for making an estimate using a trained model which is generated by performing training based on collected date on a device, the system comprising:
    at least one memory that stores instructions; and
    at least one processor that execute the instructions to perform:
    obtaining device information about a device being used by a user;
    using the trained model to estimate a setting value related to a process to be performed by the device being used by the user;
    determining whether the estimated setting value is settable on the device based on the obtained device information; and
    adjusting the estimated setting value if it is determined that the estimated setting value is unable to be set,
    wherein the device being used by the user displays the adjusted setting value as a setting value related to the process to be performed by the device.

2. The system according to claim 1, wherein, if it is determined that the estimated setting value is unable to be set, the estimated setting value is adjusted by correcting the estimated setting value to a setting value settable on the device based on the obtained device information.

3. The system according to claim 1, wherein if it is determined that the estimated setting value is settable, the device displays the estimated setting value as the setting value related to the process to be performed by the device.

4. The system according to claim 1, wherein if a setting to not use estimation using the trained model is made by the user, the device displays a default value retained by the device instead of the adjusted setting value.

5. The system according to claim 1, wherein the device being used by the user displays the adjusted setting value as the setting value related to the process to be performed by the device and further displays information for making it recognized that the estimated setting value is displayed.

6. The system according to claim 1, wherein if a plurality of estimated setting values and adjusted and a conflict occurs between the plurality of adjusted setting values, a further adjustment is made to resolve the conflict between the plurality of adjusted setting values.

7. The system according to claim 1, wherein the trained model is generated by performing the training based on data obtained by numerically vectorizing the collected data, and wherein the collected include a paper size and a number of pages of a document as input data, and further include a setting value set in performing a copy as correct answer data.

8. The system according to claim 1, wherein the system can use a plurality of trained models,
wherein the estimated setting value is estimated by using a first trained model for the user who uses the device if the plurality of trained model include the first trained model, and
wherein the estimated setting value is estimated by using a second trained model for a tenant of the device if the plurality of trained model does not include the first trained model but include the second trained model.

9. A method for controlling a system for making an estimate using a trained model that is generated by performing training based on collected data on a device, the method comprising:
obtaining device information about a device being used by a user;
using the trained model to estimate a setting value related to a process to be performed by the device being used by the user;
determining whether the estimated setting value is settable on the device based on the obtained device information; and
adjusting the estimated setting value, if the estimated setting value is unable to be set,
wherein the device being used by a user displays the adjusted setting value as a setting value related to the process to be performed by the device.

10. A computer-readable non-transitory storage medium storing a program to be executed in a system for causing a computer to perform operations for making an estimate using a trained model that is generated by performing training based on collected date on a device, the operations comprising:
obtaining device information about a device being used by a user;
using the trained model to estimate a setting value related to a process to be performed by the device being used by the user;
determining whether the estimated setting value is settable on the device based on the obtained device information; and
adjusting the estimated setting value, if the estimated setting value is unable to be set,
wherein the device being used by a user displays the adjusted setting value as a setting value related to the process to be performed by the device.

* * * * *